(12) United States Patent
Morishita

(10) Patent No.: US 10,479,108 B2
(45) Date of Patent: Nov. 19, 2019

(54) IMAGE FORMING APPARATUS

(71) Applicant: CANON KABUSHIKI KAISHA, Tokyo (JP)

(72) Inventor: Yusuke Morishita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/961,619

(22) Filed: Apr. 24, 2018

(65) Prior Publication Data

US 2018/0311971 A1   Nov. 1, 2018

(30) Foreign Application Priority Data

May 1, 2017   (JP) .................................. 2017-091065

(51) Int. Cl.
*B41J 2/47*     (2006.01)
*G02B 26/12*    (2006.01)

(52) U.S. Cl.
CPC ............ *B41J 2/471* (2013.01); *G02B 26/124* (2013.01); *G02B 26/125* (2013.01)

(58) Field of Classification Search
CPC ....... B41J 2/471; G02B 26/125; G02B 26/124
See application file for complete search history.

(56) References Cited

U.S. PATENT DOCUMENTS

2016/0018753 A1*  1/2016  Sugimoto ............ G03G 15/043
                                                        347/118

FOREIGN PATENT DOCUMENTS

JP    2011-148142 A  *  4/2011  ................ B41J 2/44
JP    2011-148142        8/2011

* cited by examiner

*Primary Examiner* — Yaovi M Ameh
(74) *Attorney, Agent, or Firm* — Venable LLP

(57) ABSTRACT

An image forming apparatus including: a light source configured to emit a light beam; a rotary polygon mirror including a plurality of reflection surfaces each configured to deflect the light beam emitted by the light source so that the light beam scans a surface of a photosensitive member; a light receiving portion configured to output a light receiving signal by receiving the light beam reflected by each of the plurality of reflection surfaces; a conversion unit configured to convert the light receiving signal to a pulse signal; a measurement unit configured to measure pulse widths of a plurality of pulse signals corresponding to the plurality of reflection surfaces, respectively; and an identification unit configured to identify a rotation phase of the rotary polygon mirror based on a measurement result of the measurement unit and reference values to be compared with the measurement result.

14 Claims, 15 Drawing Sheets

IMAGE FORMING APPARATUS

BACKGROUND OF THE INVENTION

Field of the Invention

The present invention relates to an image forming apparatus including a rotary polygon mirror configured to deflect a light beam so that the light beam emitted from a light source scans a surface of a photosensitive member to form an electrostatic latent image.

Description of the Related Art

Hitherto, a digital copying machine, a laser beam printer, a facsimile apparatus, or other such electrophotographic image forming apparatus includes a light scanning apparatus configured to scan a surface of a photosensitive member with a light beam to form an electrostatic latent image. In the light scanning apparatus, the light beam is emitted from a light source based on image data. The light beam emitted from the light source is deflected by a rotary polygon mirror. The deflected light beam is transmitted through an imaging lens to be imaged on the surface of the photosensitive member as a light spot. The light spot imaged on the surface of the photosensitive member is moved on the surface of the photosensitive member in accordance with rotation of the rotary polygon mirror to form an electrostatic latent image on the surface of the photosensitive member.

An imaging lens has an fθ characteristic. The fθ characteristic represents an optical characteristic of imaging the light beam on the surface of the photosensitive member so that the light spot moves on the surface of the photosensitive member at a constant speed while the rotary polygon mirror is being rotated at a constant angular velocity. Appropriate exposure can be performed through use of an imaging lens having the fθ characteristic. However, the imaging lens having the fθ characteristic is relatively large in size and high in cost. Therefore, for the purpose of reduction in size or cost of an image forming apparatus, it is conceived to avoid using the imaging lens itself or to use an imaging lens that does not have the fθ characteristic.

Meanwhile, electric partial magnification correction for modulating the frequency of an image clock during scanning is executed so that dots formed on the surface of the photosensitive member have a fixed width even when the light spot does not move on the surface of the photosensitive member at a constant speed. However, even when the imaging lens having the fθ characteristic is not used and the dots have a fixed width due to the above-mentioned electric correction, for example, dots at end portions and dots at central portions in the main scanning direction have different time required for forming one dot. In other words, the light spot moves on the surface of the photosensitive member at different speeds to form dots depending on whether those dots are formed at the end portions or at the central portions in the main scanning direction. Therefore, dots at the end portions and dots at the central portions in the main scanning direction have different exposure amounts per unit area on the surface of the photosensitive member. This difference in exposure amount may result in occurrence of an image defect.

Thus, the image is required to be corrected by executing partial magnification correction for correcting a print position and a print width, or luminance correction processing for adjusting a light intensity of a light beam to correct a print density. Further, the rotary polygon mirror has a manufacturing tolerance for each reflection surface, and thus a correction parameter is required to be assigned to each reflection surface for correction. In order to enable this correction, it is required to identify a reflection surface that has deflected the light beam to form light spots on the surface of the photosensitive member, from among a plurality of reflection surfaces of the rotary polygon mirror.

To identify the reflection surface, in Japanese Patent Application Laid-Open No. 2011-148142, a beam detector detects a light beam deflected by a reflection surface of a rotary polygon mirror, a cycle of a beam detection signal output from the beam detector is counted, and the pattern matching between the counted cycle and a cycle stored in advance is executed to identify the reflection surface.

However, when the cycle of the beam detection signal is synchronized with the clock to be counted, there is a requirement for a data area large enough to store the count values of cycles for the number of reflection surfaces of the rotary polygon mirror. Further, there is also a requirement for storing data on cycles of the beam detection signal for pattern matching, which results in a problem in that a circuit scale becomes large to increase costs.

SUMMARY OF THE INVENTION

In order to solve the above-mentioned problem, the present invention provides an image forming apparatus configured to identify a rotation phase of a rotary polygon mirror with a simple configuration and at low costs.

According to one embodiment of the present invention, there is provided an image forming apparatus comprising:
 a light source configured to emit a light beam;
 a rotary polygon mirror including a plurality of reflection surfaces each configured to deflect the light beam emitted by the light source so that the light beam scans a surface of a photosensitive member;
 a light receiving portion configured to output a light receiving signal by receiving the light beam reflected by each of the plurality of reflection surfaces;
 a conversion unit configured to convert the light receiving signal to a pulse signal;
 a measurement unit configured to measure pulse widths of a plurality of pulse signals corresponding to the plurality of reflection surfaces, respectively; and
 an identification unit configured to identify a rotation phase of the rotary polygon mirror based on a measurement result of the measurement unit and reference values to be compared with the measurement result.

Further features of the present invention will become apparent from the following description of exemplary embodiments with reference to the attached drawings.

DESCRIPTION OF THE EMBODIMENTS

Modes for carrying out the present invention are described below with reference to the accompanying drawings.

First Embodiment

In a first embodiment of the present invention, through detection of a width of a valid interval of a BD signal, correspondence between a BD signal at some timing and a reflection surface is determined from a degree of variation in width.

<Image Forming Apparatus>

Figure 1:
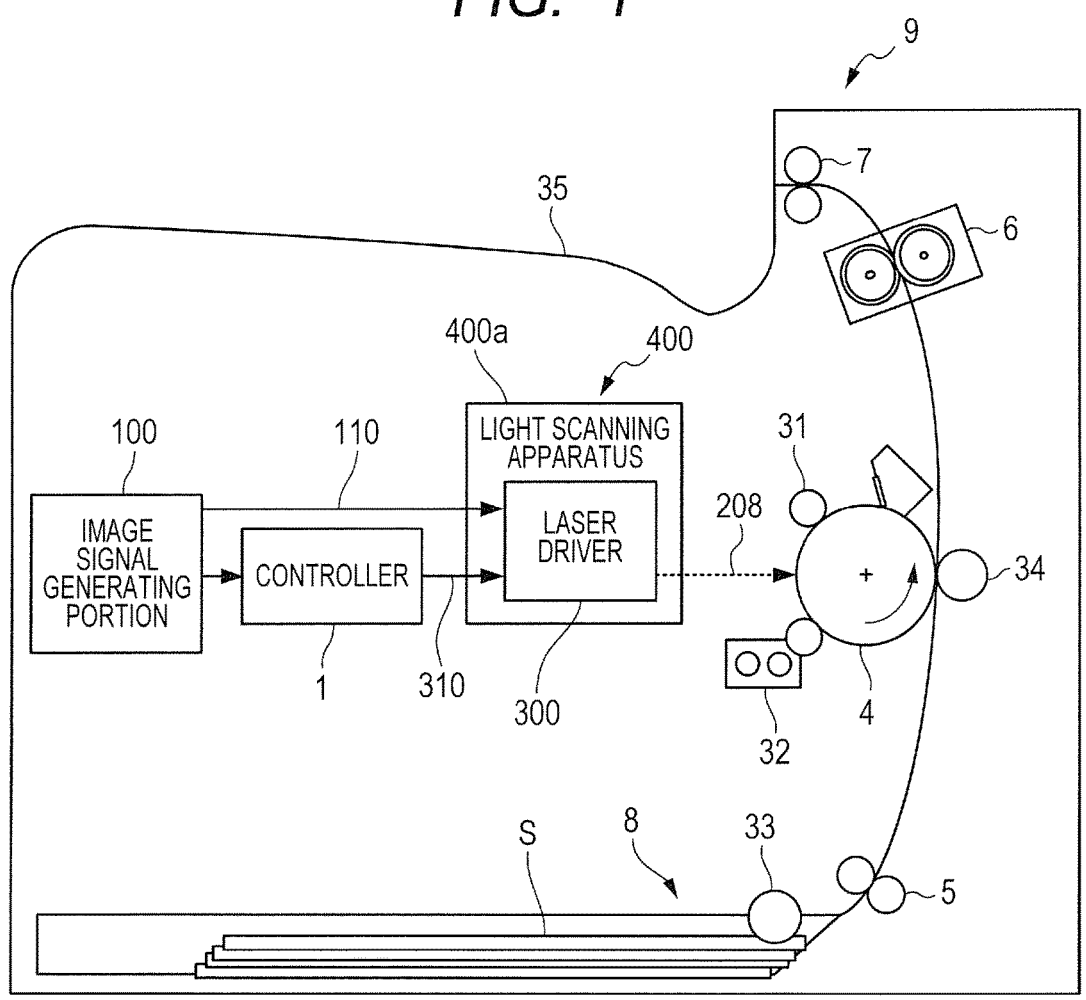
FIG. 1 is a schematic diagram of an image forming apparatus.

FIG. 1 is a schematic diagram of an image forming apparatus 9. The image forming apparatus 9 includes a light scanning apparatus 400 serving as a light scanning unit configured to scan a surface of a photosensitive drum 4 serving as a photosensitive member with a light beam. The light scanning apparatus 400 includes a laser driver 300. The laser driver 300 is configured to emit a laser light beam (hereinafter referred to as "light beam") 208 based on a VDO signal 110 serving as an image signal output from an image signal generating portion 100 and a control signal 310 output from a controller 1. The light beam 208 scans the surface of the photosensitive drum 4, which is uniformly charged by a charger 31 serving as a charging unit, to form an electrostatic latent image (hereinafter referred to as "latent image") on the surface of the photosensitive drum 4. A developing device 32 serving as a developing unit is configured to cause a toner serving as a developer to adhere to the latent image to form a toner image. A recording medium S, for example, a paper sheet, is received in a feeder unit 8. The recording medium S fed from the feeder unit 8 by a pickup roller 33 is conveyed to a transfer position by sheet feeding rollers 5 so as to be brought into contact with the photosensitive drum 4. The toner image is transferred onto the recording medium S conveyed to the transfer position by a transfer roller 34. The toner image transferred onto the recording medium S is heated and pressurized by a fixing device 6 to be fixed to the recording medium S. The recording medium S having an image formed thereon is delivered to a delivery tray 35 by delivery rollers 7.

<Light Scanning Apparatus>

Figure 2A:
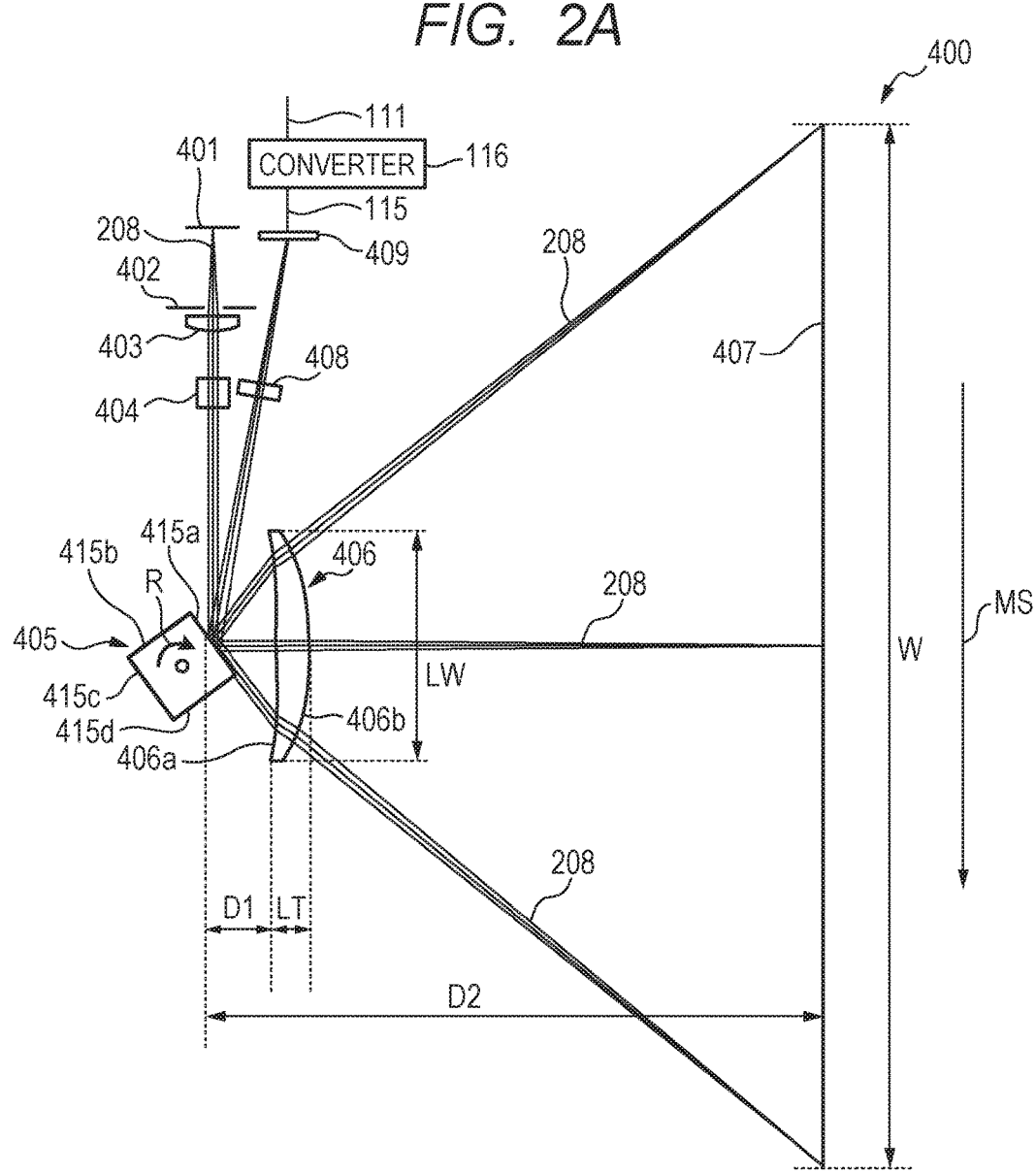
FIG. 2A and FIG. 2B are cross-sectional views of a light scanning apparatus in a first embodiment of the present invention.
Figure 2B:
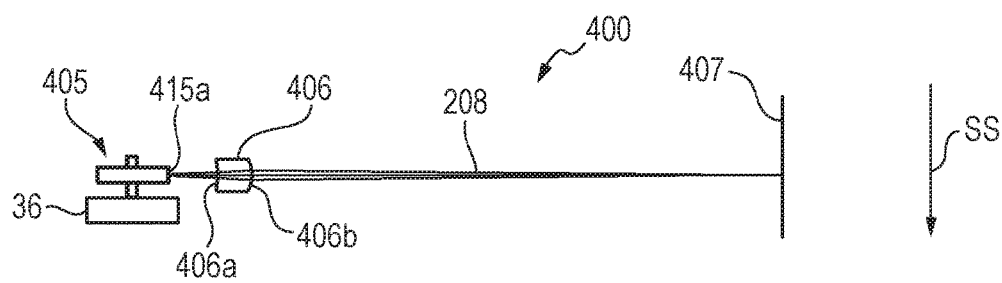

FIG. 2A and FIG. 2B are cross-sectional views of the light scanning apparatus 400 in the first embodiment. FIG. 2A is a view for illustrating a main scanning section of the light scanning apparatus 400. FIG. 2B is a view for illustrating a sub-scanning section of the light scanning apparatus 400. The main scanning section is a cross section obtained by taking the light scanning apparatus 400 along a plane containing an optical axis of an imaging lens (imaging optical element) 406 serving as a scanning lens and a main scanning direction MS. The sub-scanning section is a cross section obtained by taking the light scanning apparatus 400 along a plane containing the optical axis of the imaging lens 406 and being perpendicular to the main scanning section. The light scanning apparatus 400 includes a light source 401, a rotary polygon mirror 405 serving as a deflection device, and a casing (optical housing) 400a illustrated in FIG. 1. The light source 401 is configured to emit the light beam 208. The rotary polygon mirror 405 is configured to deflect the light beam 208 so that the light beam 208 emitted from the light source 401 scans the surface of the photosensitive drum 4 (hereinafter referred to as "scanned surface 407"). The casing 400a is mounted with the light source 401, and holds the rotary polygon mirror 405 and optical elements in the inside.

In the first embodiment, the light beam 208 emitted from the light source 401 is shaped to have an elliptic shape by an aperture-stop 402 to enter a coupling lens 403. The light beam 208 that has passed through the coupling lens 403 is converted into substantially collimated light to enter an anamorphic lens 404. The substantially collimated light includes weak convergent light and weak divergent light. The anamorphic lens 404 has a positive refractive power within the main scanning section, and is configured to convert the incoming light beam into the light beam 208 converged within the main scanning section. The anamorphic lens 404 is also configured to condense the light beam 208 in the vicinity of a reflection surface 415, which serves as a deflecting surface of the rotary polygon mirror 405, within the sub-scanning section to form a line image that is long in the main scanning direction MS.

The light beam 208 that has passed through the anamorphic lens 404 is deflected by a plurality of reflection surfaces 415 (415a, 415b, 415c, and 415d) of the rotary polygon mirror 405. The light beam 208 that has been deflected by the reflection surface 415 is transmitted through the imaging lens 406 to be imaged on the scanned surface 407 as a light spot. The imaging lens 406 is an imaging optical element. In the first embodiment, an imaging optical system is formed of only a single imaging optical element (imaging lens 406). The light beam 208 is imaged on the scanned surface 407 by the imaging lens 406 to form an image (light spot) having a predetermined spot shape. The rotary polygon mirror 405 is rotated in a direction indicated by an arrow R at a constant angular velocity by a motor 36 serving as a drive device. The light spot is moved on the scanned surface 407 in the main scanning direction MS to form a latent image on the scanned surface 407. The main scanning direction MS is a direction parallel with the surface of the photosensitive drum 4 and perpendicular to a moving direction of the surface (rotation direction) of the photosensitive drum 4. A sub-scanning direction SS is a direction perpendicular to the main scanning direction MS and the optical axis of the light beam 208.

A beam detector (hereinafter referred to as "BD") 409 and a BD lens 408 form an optical system for generating a synchronization signal for determining a timing to write a latent image on the scanned surface 407. The light beam 208 that has passed through the BD lens 408 enters the BD 409 serving as a light receiving portion including a photodiode to be detected thereby. The BD 409 receives the light beam 208, and outputs a light receiving signal (analog signal) 115. The light receiving signal 115 is input to a converter (e.g., analog-digital conversion circuit) 116. The converter 116 is a converter (conversion circuit) configured to digitalize an analog signal by a threshold voltage. The converter 116 converts the light receiving signal 115 into a light detection signal (hereinafter referred to as "BD signal") 111 serving as a pulse signal. In the first embodiment, the BD signal 111 is an active low (negative logic) signal, but may be an active high (positive logic) signal. When the BD signal 111 is an active low (negative logic) signal, the low level part is considered to be a pulse. The writing timing of the light beam 208 is controlled based on the timing at which the light beam 208 is detected by the BD 409. The light source 401 is a semiconductor laser chip. The light source 401 in the first embodiment includes one light emitting portion 11 illustrated in FIG. 4. The light source 401, the coupling lens 403, the anamorphic lens 404, the imaging lens 406, the rotary polygon mirror 405, and other such various optical members are held in the casing (optical box) 400a of the light scanning apparatus 400 illustrated in FIG. 1.

<Imaging Lens>

As illustrated in FIG. 2A and FIG. 2B, the imaging lens 406 has two optical surfaces (lens surfaces) including an incident surface (first surface) 406a and an outgoing surface (second surface) 406b. The imaging lens 406 is configured so that, within the main scanning section, the light beam 208 deflected by the reflection surface 415 is transmitted through the imaging lens 406 to scan the scanned surface 407 with a predetermined scanning characteristic. The imaging lens 406 is also configured to change the light spot of the light beam 208 on the scanned surface 407 so as to have a predetermined shape. The imaging lens 406 is also configured to bring the vicinity of the reflection surface 415 and the vicinity of the scanned surface 407 to an optically conjugate relationship within the sub-scanning section. With this, an optical facet angle error of the reflection surface 415 is compensated for. That is, the light beam 208 causes less deviation of the scanning position on the scanned surface 407 in the sub-scanning direction SS, which is caused by the angle error (optical facet angle error) of the reflection surface 415 with respect to a rotation axis of the rotary polygon mirror 405. The imaging lens 406 in the first embodiment is a plastic molded lens formed by injection molding, but a glass molded lens may be employed as the imaging lens 406. A molded lens is easy to be molded into an aspherical shape, and is suitable for mass production. It is possible to achieve improvements in productivity and optical performance of the imaging lens 406 by employing the molded lens as the imaging lens 406.

The imaging lens 406 does not have an fθ characteristic, or has an fθ characteristic weaker than that of a conventional fθ lens. That is, the imaging lens 406 does not have such a scanning characteristic as to image the light beam, which is passing through the imaging lens 406 while the rotary polygon mirror 405 is being rotated at a constant angular velocity, as the light spot moving on the scanned surface 407 at a constant speed. The imaging lens 406 can be arranged in proximity to the rotary polygon mirror 405 through use of the imaging lens 406 that does not have the fθ characteristic.

That is, as illustrated in FIG. 2A, a distance D1 between the rotary polygon mirror 405 and the imaging lens 406 can be reduced. Further, the imaging lens 406 that does not have the fθ characteristic can have a width LW of the imaging lens 406 in the main scanning direction MS and a thickness LT of the imaging lens 406 in the optical axis direction made smaller than those of an imaging lens having an fθ characteristic. This enables reduction in size of the casing 400a of the light scanning apparatus 400 illustrated in FIG. 1.

Meanwhile, the imaging lens having the fθ characteristic may have a part exhibiting a drastic change in shapes of an incident surface and an outgoing surface of the imaging lens in the main scanning section. The imaging lens having the fθ characteristic may not exhibit satisfactory imaging performance due to the drastic change in the shapes of the incident surface and the outgoing surface. In contrast, the imaging lens 406 that does not have the fθ characteristic scarcely have the part exhibiting the drastic change in the shapes of the incident surface 406a and the outgoing surface 406b of the imaging lens 406 in the main scanning section, and can therefore exhibit satisfactory imaging performance. The scanning characteristic of the imaging lens 406 that does not have the fθ characteristic is expressed by Expression (1).

$$Y = \frac{K}{B}\tan(B\theta) \qquad \text{Expression (1)}$$

In Expression (1), θ represents an angle (hereinafter referred to as "scanning angle") between the optical axis of the imaging lens 406 and the light beam 208 deflected by the rotary polygon mirror 405. Y (mm) represents a distance (hereinafter referred to as "image height") between the optical axis of the imaging lens 406 and a position (focused position) of the light spot of the light beam 208 imaged on the scanned surface 407 in the main scanning direction MS. K (mm) represents an imaging coefficient (hereinafter referred to as "on-axis image height") at an image height on the optical axis of the imaging lens 406. B represents a coefficient (hereinafter referred to as "scanning characteristic coefficient") for determining the scanning characteristic of the imaging lens 406. The on-axis image height represents the image height on the optical axis of the imaging lens 406, and is therefore an image height Y (Y=0=Ymin) exhibited when the scanning angle θ is 0 (θ=0). In the first embodiment, the image height (Y≠0) at a position (θ≠0) deviated from the optical axis (θ=0) of the imaging lens 406 is referred to as "off-axis image height". In addition, image heights (Y=+Ymax and Y=−Ymax) at positions (θ=−θmax and θ=−θmax) being farthest from the optical axis of the imaging lens 406 (θ=0) are each referred to as "outermost off-axis image height". A width (hereinafter referred to as "scanning width") W of a predetermined region (hereinafter referred to as "scanning region") that allows the latent image to be formed on the scanned surface 407 in the main scanning direction MS is expressed as W=+|Ymax|+|−Ymax|. The center of the scanning region corresponds to the on-axis image height. Both end portions of the scanning region each correspond to the outermost off-axis image height. A deflection angle of the light beam required for scanning the scanning region by the scanning width W corresponds to a scanning field angle.

In this case, the imaging coefficient K is a coefficient corresponding to "f" within a scanning characteristic (fθ characteristic) Y=fθ exhibited when collimated light enters the imaging lens 406. That is, the imaging coefficient K is a coefficient for bringing the image height Y and the scanning angle θ to a proportional relationship in the same manner as the fθ characteristic when light other than the collimated light enters the imaging lens 406. To give further details of the scanning characteristic coefficient B, Expression (1) becomes Y=Kθ when the scanning characteristic coefficient B is 0 (B=0), which corresponds to the scanning characteristic Y=fθ (equidistant projection method) of an fθ lens used for a conventional light scanning apparatus. Further, Expression (1) becomes Y=K tan θ when the scanning characteristic coefficient B is 1 (B=1), which corresponds to a projection characteristic Y=f tan θ (central projection method) of a lens used for an image pickup apparatus (camera) or the like. That is, it is possible to obtain a scanning characteristic between the projection characteristic (Y=f tan θ) and the fθ characteristic (Y=fθ) by setting the scanning characteristic coefficient B within a range of 0≤B≤1 in Expression (1).

In this case, when Expression (1) is differentiated with respect to the scanning angle θ, a scanning speed dY/dθ of the light beam on the scanned surface 407 with respect to the scanning angle θ is obtained as indicated in Expression (2).

$$\frac{dY}{D\theta} = \frac{K}{\cos^2(B\theta)} \qquad \text{Expression (2)}$$

According to Expression (2), the scanning speed dY/dθ at the on-axis image height (θ=0) becomes K because the scanning angle θ is 0 (θ=0). When Expression (2) is further divided by the scanning speed dY/dθ=K at the on-axis image height, Expression (3) is obtained.

$$\frac{\frac{dY}{d\theta}}{K} - 1 = \frac{1}{\cos^2(B\theta)} - 1 = \tan^2(B\theta) \qquad \text{Expression (3)}$$

Expression (3) indicates a deviation amount (partial magnification) of the scanning speed dY/dθ at the off-axis image height with respect to the scanning speed (imaging coefficient K) at the on-axis image height. In the first embodiment, the partial magnification at the image height Y is expressed as a percentage (%) of a deviation amount (partial magnification deviation amount ((dY/dθ)/K−1)) obtained by subtracting 1 from a ratio ((dY/dθ)/K) of the scanning speed dY/dθ at the off-axis image height to the scanning speed (imaging coefficient K) at the on-axis image height. The scanning speed of the light beam 208 emitted from the light scanning apparatus 400 using the imaging lens 406 in the first embodiment differs between at the on-axis image height (Y=0=Ymin) and at the off-axis image height Y (Y≠0) except when the scanning characteristic coefficient B is 0 (B=0).

Figure 3:
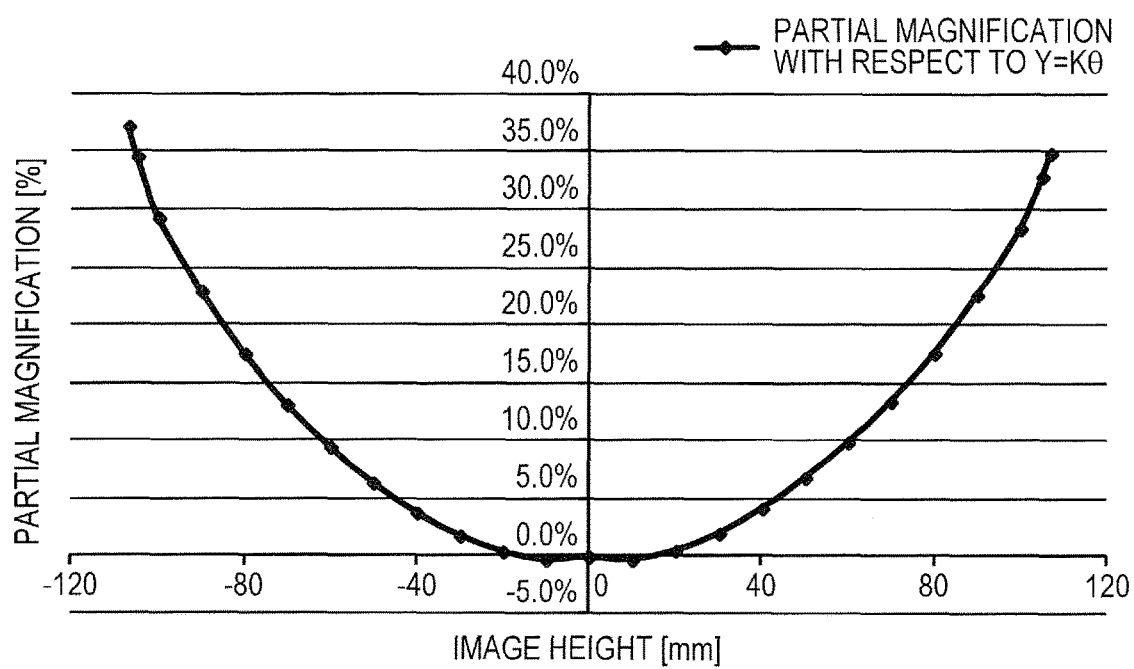
FIG. 3 is a graph for showing a partial magnification with respect to an image height for the light scanning apparatus.

FIG. 3 is a graph for showing the partial magnification (%) with respect to the image height Y (mm) for the light scanning apparatus 400. In FIG. 3, there is shown a relationship between the image height Y and the partial magnification, which is exhibited when the image height Y on the scanned surface 407 is expressed by the scanning characteristic of Y=Kθ. When the imaging lens 406 has the scanning characteristic of Y=Kθ, as shown in FIG. 3, the partial magnification increases as the image height becomes farther from the on-axis image height (Y=0) and closer to the respective outermost off-axis image heights (Y=+Ymax and Y=−Ymax). This is because the scanning speed gradually increases as the image height becomes farther from the on-axis image height and closer to the outermost off-axis image height. For example, the partial magnification of 30% means that, when the light beam is scanned in the main scanning direction for a unit time, a length (hereinafter referred to as "scanning length") by which the scanned surface 407 is scanned with the light beam in the main scanning direction is 1.3 times longer than a scanning length at the on-axis image height. Thus, when a pixel width in the main scanning direction is determined based on a fixed time interval determined by a cycle period of an image clock, a scanning length per pixel differs between at the on-axis image height (Y=0) and at the off-axis image height (Y≠0). Therefore, the scanning length per pixel in the main scanning direction at the off-axis image height (Y≠0) becomes longer than the scanning length per pixel in the main scanning direction at the on-axis image height (Y=0), and a pixel density changes depending on the image height (position in the main scanning direction).

Further, the scanning speed gradually becomes higher as the image height Y becomes farther from the on-axis image height and closer to the outermost off-axis image height (as the absolute value of the image height Y becomes larger). Therefore, a time required for the light spot near the outermost off-axis image height to scan the scanned surface 407 by a unit length is shorter than a time required for the light spot near the on-axis image height to scan the scanned surface 407 by the unit length. This means that, when a light emission luminance of the light source 401 is constant, an exposure amount per unit length with the image height being near the outermost off-axis image height becomes smaller than an exposure amount per unit length with the image height being near the on-axis image height.

In a case of the imaging lens 406 having such a scanning characteristic as described above, variations in partial magnification that depend on a main scanning position and variations in exposure amount per unit length that depend on the main scanning position may exert adverse influence in maintaining satisfactory image quality. In view of this, in the first embodiment, in order to obtain satisfactory image quality, correction of the partial magnification and luminance correction for correcting the exposure amount per unit length are performed. In particular, the scanning field angle becomes larger as an optical path length between the rotary polygon mirror 405 and the photosensitive drum 4 becomes shorter, and hence a difference between the scanning speed at the on-axis image height and the scanning speed at the outermost off-axis image height becomes larger. According to extensive investigation of the inventor of the present invention, it has been clarified that, when the light scanning apparatus 400 is reduced in size, the scanning speed at the outermost off-axis image height becomes equal to or larger than 120% of the scanning speed at the on-axis image height. In this case, the rate of change in scanning speed of the light scanning apparatus 400 is equal to or larger than 20%. In a case of such a light scanning apparatus 400, it becomes difficult to maintain satisfactory image quality due to the influence of the variations in the partial magnification depending on the main scanning position and the variations in exposure amount per unit length depending on the main scanning position.

A rate C (%) of change in scanning speed has a value expressed as C=((Vmax−Vmin)/Vmin)×100, where Vmin represents the lowest scanning speed and Vmax represents the highest scanning speed. In the light scanning apparatus 400 in the first embodiment, the scanning speed becomes the lowest scanning speed Vmin at the on-axis image height (center of the scanning region), and becomes the highest scanning speed Vmax at the outermost off-axis image height (both end portions of the scanning region). An image forming apparatus including the light scanning apparatus 400 having such a scanning characteristics, to which an exposure control system 301 described below is applied, can form an image with satisfactory image quality through use of the imaging lens 406 that does not have the fθ characteristic.

<Exposure Control System>

Figure 4:
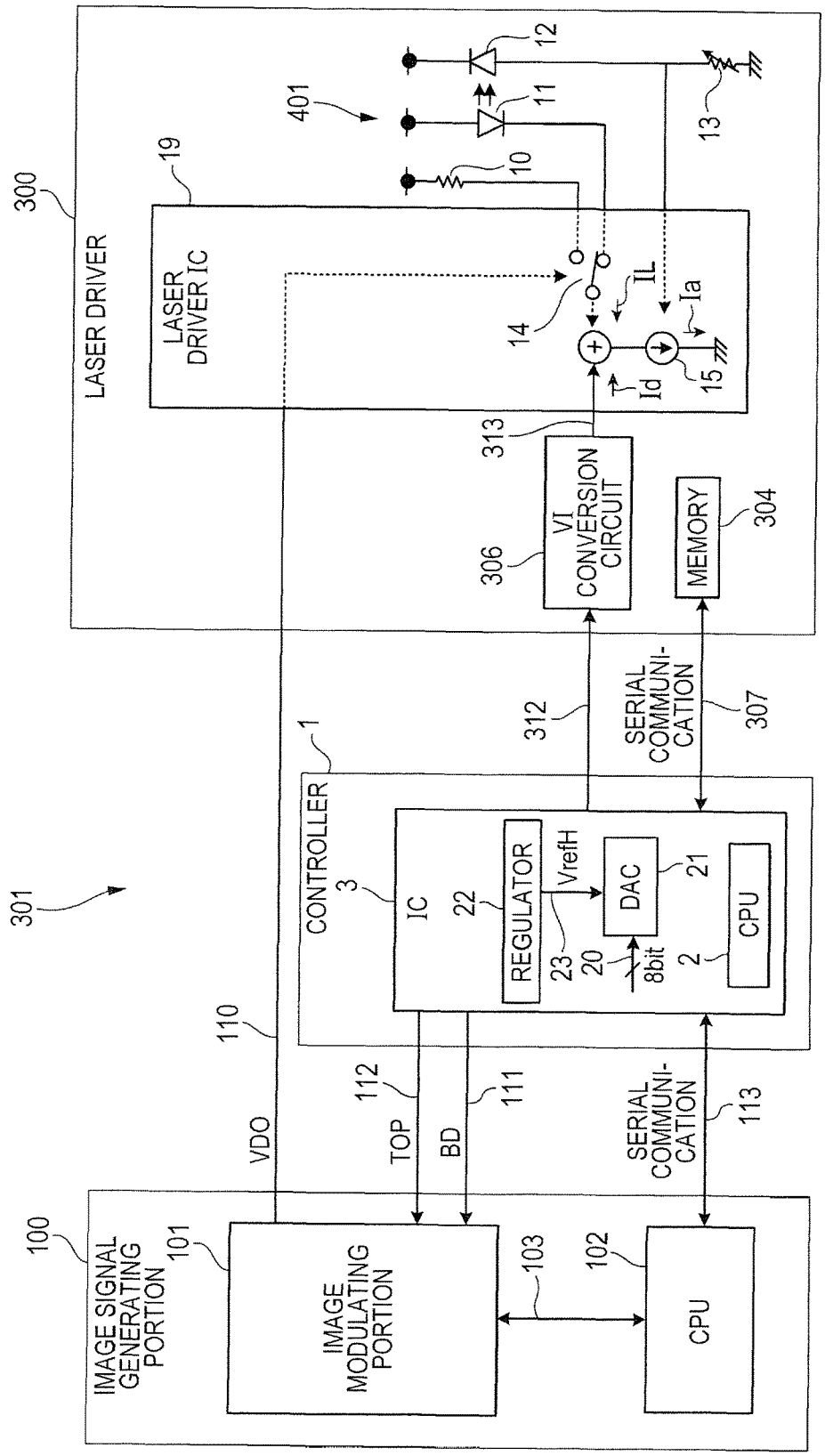
FIG. 4 is a block diagram of an exposure control system within the image forming apparatus.

FIG. 4 is a block diagram of the exposure control system 301 within the image forming apparatus 9. The exposure control system 301 includes an image signal generating portion 100, a controller 1, and a laser driver 300. The image signal generating portion 100 includes an image modulating portion 101 and a CPU 102. The image signal generating portion 100 in the first embodiment is a board in which the image modulating portion 101 and the CPU 102, which are an integrated circuit (IC), are implemented. The image modulating portion 101 and the CPU 102 may be constructed from a processor, which is one integrated circuit. In that case, the image signal generating portion 100 illustrated in FIG. 4 is one processor, and the image modulating portion 101 and the CPU 102 are internal modules of the image signal generating portion 100. The image signal generating portion 100 is configured to perform various operations under the control of the CPU 102. The image modulating portion 101 is connected to the CPU 102 by a system bus 103. The image signal generating portion 100 receives information including a print job from a host computer (not shown), and generates the VDO signal 110 as the image signal based on image data included in the information. The image signal generating portion 100 also has a function of that of a pixel width correction unit. The controller 1 is configured to control the image forming apparatus 9. The controller 1 also has a function of that of a luminance correction unit configured to control a light intensity of the light source 401. The laser driver 300 is configured to supply a current to the light source 401 based on the VDO signal 110 to cause the light source 401 to emit a light beam.

The image signal generating portion 100 transmits a signal for instructing to start printing to the controller 1 through a serial communication 113 when the VDO signal 110 for image formation is ready to be output. When printing is ready to be performed, the controller 1 transmits a TOP signal 112 serving as a sub-scanning synchronization signal and a BD signal 111 serving as a main scanning synchronization signal to the image signal generating portion 100. When receiving the TOP signal 112 and the BD signal 111, the image signal generating portion 100 outputs the VDO signal 110 to the laser driver 300 at a predetermined timing.

The controller 1 includes an integrated circuit (hereinafter referred to as "IC") 3. The IC 3 has built therein a CPU 2, a DA converter (hereinafter referred to as "DAC") 21 configured to convert an 8-bit digital signal 20 into an analog signal, and a regulator 22. The IC 3 functions as the luminance correction unit in cooperation with the laser driver 300.

The laser driver 300 includes a memory 304, a voltage/current conversion circuit (hereinafter referred to as "VI conversion circuit") 306 configured to convert a voltage into a current, a laser driver IC 19, and the light source 401. The laser driver 300 supplies a drive current IL to the light emitting portion 11 being a laser diode of the light source 401. The memory 304 stores partial magnification characteristic information (profile) including partial magnifications corresponding to a plurality of image heights (a plurality of positions in the main scanning direction) and information on a correction current to be supplied to the light emitting portion 11. It suffices that the partial magnification characteristic information is a profile indicating magnification correction data used for correcting the partial magnification for each of a plurality of regions in the main scanning direction. The partial magnification characteristic information may be information (magnification correction data) including the scanning speed of the light spot on the scanned surface 407 corresponding to the image height (position in the main scanning direction) for each of the plurality of regions.

The information stored in the memory 304 is transmitted to the IC 3 through a serial communication 307 based on the control of the CPU 2. The IC 3 adjusts a voltage (VrefH) 23 output from the regulator 22 based on the information on the correction current to be supplied to the light emitting portion 11 stored in the memory 304. The voltage 23 serves as a reference voltage for the DAC 21. The IC 3 sets the 8-bit digital signal (input data) 20 to be input to the DAC 21, and outputs an analog voltage for luminance correction (hereinafter referred to as "luminance correction analog voltage") 312, which increases or decreases within a main scanning segment in synchronization with the BD signal 111. The luminance correction analog voltage 312, which increases or decreases within the main scanning segment, is input to the VI conversion circuit 306. The VI conversion circuit 306 is configured to convert the luminance correction analog voltage 312 into a current Id 313, and to output the current Id 313 to the laser driver IC 19. In the first embodiment, the IC 3 mounted to the controller 1 outputs the luminance correction analog voltage 312, but the DAC 21 may be provided on the laser driver 300 to generate the luminance correction analog voltage 312 near the laser driver IC 19. Further, the VI conversion circuit 306 may be built into the laser driver IC 19.

The laser driver IC 19 uses a switching circuit 14 to switch between whether to flow the drive current IL to the light emitting portion 11 or to flow the drive current IL to a dummy the resistor 10 based on the VDO signal 110. The switching circuit 14 is configured to control the ON/OFF of the light emission from the light source 401 based on the VDO signal 110. The drive current IL (third current) supplied to the light emitting portion 11 is a current obtained by subtracting a current Id (second current) output by the VI conversion circuit 306 from a current Ia (first current) set by a constant current circuit 15. A photodiode (photoelectric conversion element) 12 is provided to the light source 401, and is configured to detect the luminance (light intensity) of the light emitting portion 11. The current Ia flowing through the constant current circuit 15 is automatically adjusted by feedback control of an internal circuit of the laser driver IC 19 so that the luminance detected by the photodiode 12 becomes a predetermined luminance. The automatic adjustment of the light intensity of the light emitting portion 11 is so-called auto power control (APC) for automatic light intensity control. The luminance adjustment of the light emitting portion 11 using the automatic adjustment of the current Ia is carried out while light is being emitted from the light emitting portion 11 in order to detect the BD signal 111 outside a printing region (FIG. 13A and FIG. 13B) for each main scanning segment. A variable resistor 13 has a value adjusted at a time of factory assembly so that a predetermined voltage is input from the photodiode 12 to the laser driver IC 19 when light is being emitted from the light emitting portion 11 with a predetermined luminance.

As described above, the drive current IL required for causing the light emitting portion 11 to emit a light beam of a predetermined luminance is a current obtained by subtracting the current Id output by the VI conversion circuit 306 from the current Ia set by the constant current circuit 15. Thus, the amount of flow of the drive current IL does not exceed that of the current Ia set by the constant current circuit 15. The VI conversion circuit 306 constructs a part of the luminance correction unit.

<Image Modulating Portion>

Figure 5:
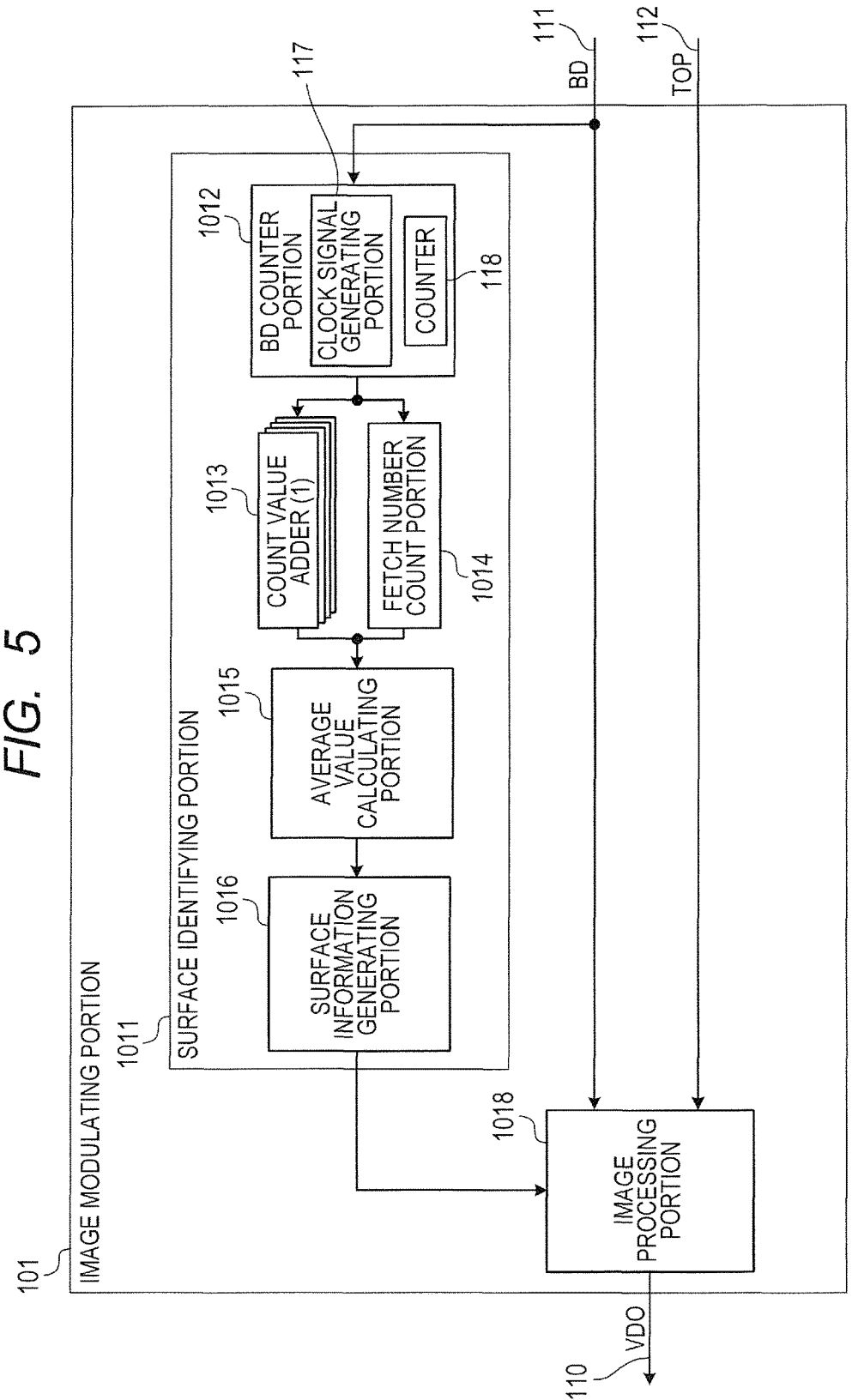
FIG. 5 is a block diagram of an image modulating portion.

Now, the image modulating portion 101 provided in the image signal generating portion 100 is described. FIG. 5 is a block diagram of the image modulating portion 101. The image modulating portion 101 includes a surface identifying portion 1011 and an image processing portion 1018. The surface identifying portion 1011 is configured to identify a reflection surface of the rotary polygon mirror (deflector) 405 based on the input BD signal 111 (hereinafter referred to as "surface identification processing"). The surface identifying portion 1011 includes a BD counter portion 1012, a count value adder 1013, an average value calculating portion 1015, and a surface information generating portion 1016. The count value adder 1013 includes a plurality of count value adders (1), (2), (3), . . . , and (n). The number n of the count value adders (n) serving as count value holding units corresponds to the number n of the reflection surface 415 of the rotary polygon mirror 405. The BD counter portion 1012 is configured to cause the count value adder 1013 with the number n of the reflection surface 415 to sequentially hold a count value. The TOP signal 112 is input to the image processing portion 1018. The BD signal 111 is input to the image processing portion 1018 and the BD counter portion 1012. The BD counter portion 1012 serving as a measurement unit includes a clock signal generating portion 117 serving as a clock signal generation unit and the counter 118 serving as a count unit. The clock signal generating portion 117 is configured to generate a clock signal of a predetermined frequency. The counter 118 is configured to count a clock signal. Specifically, the counter 118 counts (measures) the width of a valid interval of the BD signal 111. The BD counter portion 1012 measures the width of the valid interval of the BD signal 111 by the count value of the counter 118. The BD counter portion 1012 sends the count value to the count value adder 1013 and a fetch number count portion 1014. Every time the BD signal 111 is input to the BD counter portion 1012, the count value of the BD counter portion 1012 is sequentially input to the count value adders (1) to (n). Each of the count value adders (1) to (n) sequentially adds the input count value to the held count value. The fetch number count portion 1014 is configured to hold the number of times the count value is fetched to each of the count value adders (1) to (n) from the BD counter portion 1012.

The average value calculating portion 1015 serving as a calculation unit is configured to calculate the total count value of each of the count value adders (1) to (n), and average values (1) to (n) thereof based on the value of the number of times the count value is fetched, which is held by the fetch number count portion 1014. The average values (1) to (n) are obtained by dividing the total count value of each of the count value adders (1) to (n) by the value of the fetch number count portion 1014. The respective average values (1) to (n) of the count value adders (1) to (n) are input to the surface information generating portion 1016 serving as a surface information generation unit. The average values (1) to (n) are measurement values of the valid interval of the BD signal 111 corresponding to the respective plurality of reflection surfaces 415 of the rotary polygon mirror 405. The memory (storage) 304 stores, in advance, reference values (reference information) (1) to (n) of the valid interval of the BD signal 111 corresponding to the respective plurality of reflection surfaces 415 of the rotary polygon mirror 405. The surface information generating portion 1016 identifies, from the average values (1) to (n) calculated by the average value calculating portion 1015 and the reference values (1) to (n) stored in the memory 304, correspondence between the BD signal 111 at some timing and the reflection surface 415 of the rotary polygon mirror 405. The surface information generating portion 1016 sends an identification result (hereinafter referred to as "surface identification information") of the reflection surface 415 to the image processing portion 1018. That is, the surface information generating portion 1016 functions as an identification unit configured to identify a rotation phase of the rotary polygon mirror 405 based on the count value (measurement result) of the BD counter portion 1012 and the reference value to be compared with the count value.

The image processing portion 1018 selects an image processing parameter for each reflection surface 415 of the rotary polygon mirror 405 based on the surface identification information, and executes image processing such as density correction processing, halftone processing, and parallel-to-serial conversion, to output the VDO signal 110. The image processing portion 1018 stores, for each reflection surface 415, a density correction table for printing an image signal received from a host computer (not shown) at an appropriate density. The image processing portion 1018 selects a density correction table based on the surface identification information to execute the density correction processing.

Figure 6A:
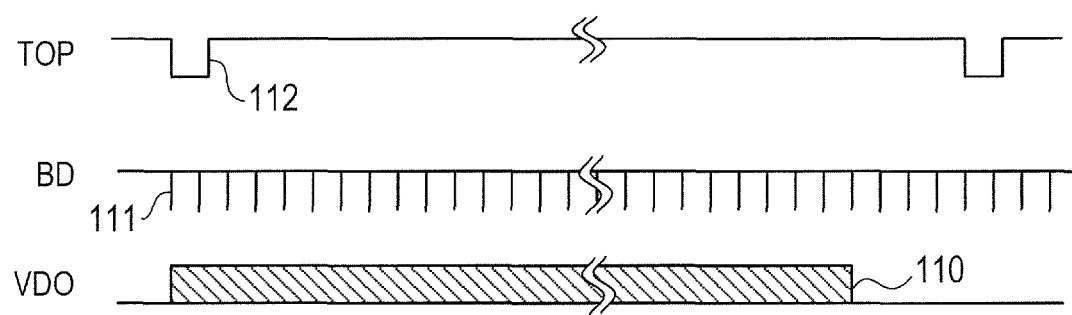
FIG. 6A and FIG. 6B are timing charts of a BD signal and a VDO signal in the first embodiment.
Figure 6B:
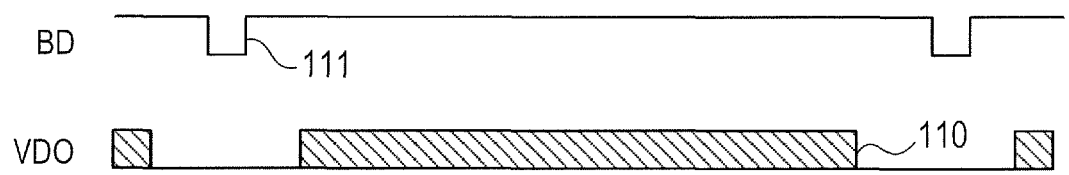

FIG. 6A and FIG. 6B are timing charts of a BD signal (synchronization signal) and a VDO signal (image signal) in the first embodiment. FIG. 6A is a timing chart of the TOP signal 112, the BD signal 111, and the VDO signal 110 for an image forming operation corresponding to one page of a recording medium. In the first embodiment, the TOP signal 112 and the BD signal 111 are active low (negative logic) signals, but may be active high (positive logic) signals. When the TOP signal 112 and the BD signal 111 are active low (negative logic) signals, the low level part is considered to be a pulse. In FIG. 6A, time elapses from the left to the right. "LOW" of the TOP signal 112 indicates that the leading edge of the recording medium has reached a predetermined position. When receiving "LOW" of the TOP signal 112, the image signal generating portion 100 outputs the VDO signal 110 to the laser driver 300 in synchronization with the BD signal 111. The light source 401 emits the light beam 208 based on the VDO signal 110 to form a latent image on the photosensitive drum 4. In FIG. 6A, for the sake of simplicity of illustration, the VDO signal 110 is drawn to be output continuously across the plurality of BD signals 111. However, in actuality, the VDO signal 110 is output in a predetermined period between the BD signals 111. The timings of the VDO signal 110 and the BD signal 111 are described with reference to FIG. 6B. FIG. 6B is a timing chart of the VDO signal 110 and the BD signal 111. When receiving a falling edge of the BD signal 111, the image signal generating portion 100 outputs the VDO signal 110 after a predetermined time period so as to enable formation of the latent image to be started from a writing start position spaced apart from the left edge of the photosensitive drum 4 by a predetermined distance. The laser driver IC 19 controls the ON/OFF of the light emission from the light source 401 based on the VDO signal 110 to form the latent image on the scanned surface 407 based on the VDO signal 110.

<Surface Identification Processing for Rotary Polygon Mirror>

Figure 7A:
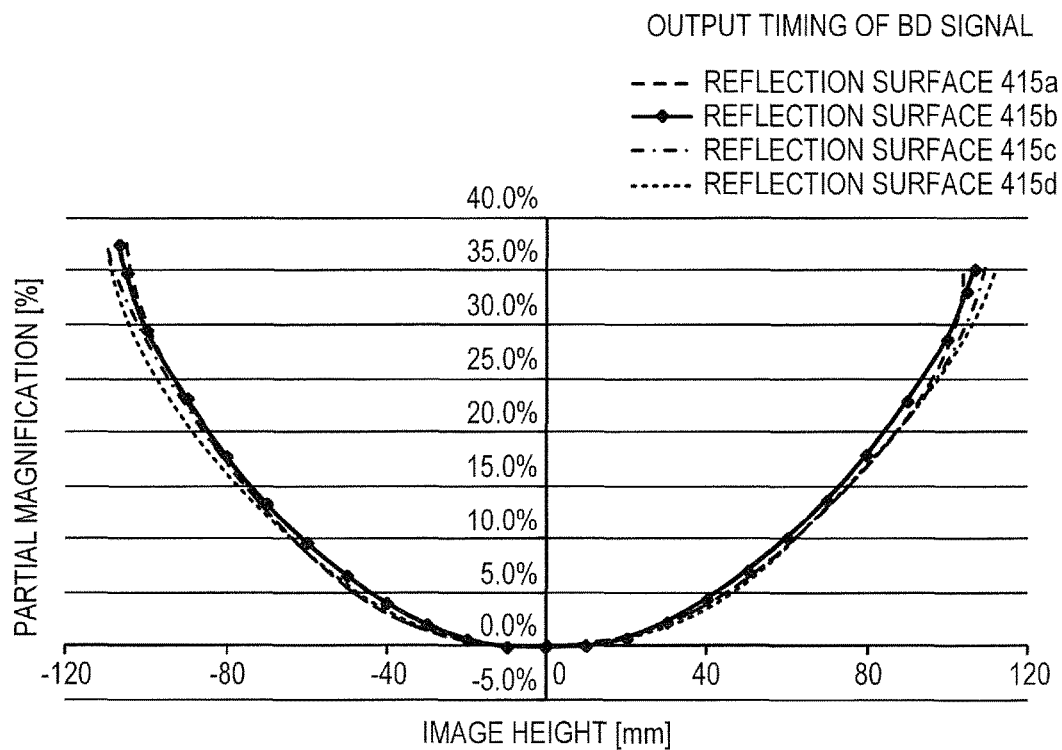
FIG. 7A is a graph for showing a partial magnification with respect to an image height for each reflection surface of a rotary polygon mirror.
Figure 7B:
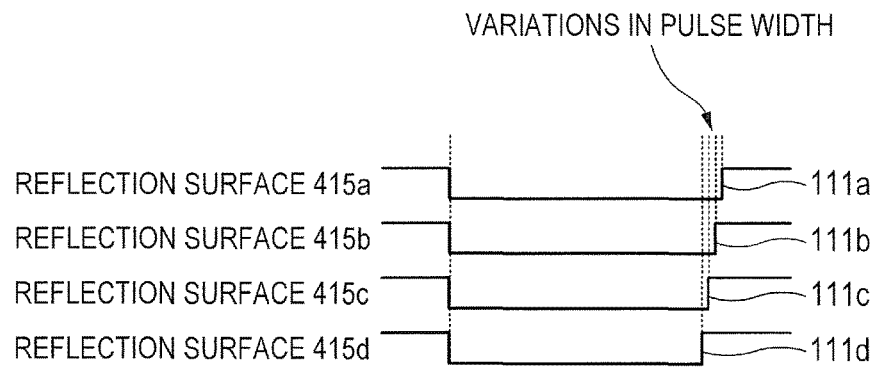
FIG. 7B is a diagram for illustrating deviation in pulse width for each reflection surface of the rotary polygon mirror.

Now, with reference to FIG. 7A and FIG. 7B, the surface identification processing for the plurality of reflection surfaces 415a, 415b, 415c, and 415d of the rotary polygon mirror 405 is described. As described with reference to FIG. 3, the image height and the partial magnification have such a relationship that the scanning speed increases gradually from the on-axis image height toward the off-axis image height to result in a larger partial magnification. FIG. 7A is a graph for showing a partial magnification with respect to an image height for each of the reflection surfaces 415a, 415b, 415c, and 415d of the rotary polygon mirror 405. As shown in FIG. 7A, the reflection surfaces 415a, 415b, 415c, and 415d of the rotary polygon mirror 405 have a variation in partial magnification. The difference in partial magnification leads to a difference in scanning speed of the light beam, and thus the reflection surfaces 415a, 415b, 415c, and 415d of the rotary polygon mirror 405 also have a variation in output timing of the BD signal 111. As illustrated in FIG. 7B, the reflection surfaces 415a, 415b, 415c, and 415d output the BD signals 111a, 111b, 111c, and 111d with different lengths of pulses (hereinafter referred to as "pulse width"), respectively. FIG. 7B is an illustration of an example of the pulse width of the BD signal 111. In the first embodiment, a reference surface is determined based on a result of measuring the pulse width of the BD signal 111 to identify each of the plurality of reflection surfaces 415 of the rotary polygon mirror 405.

Figure 8:
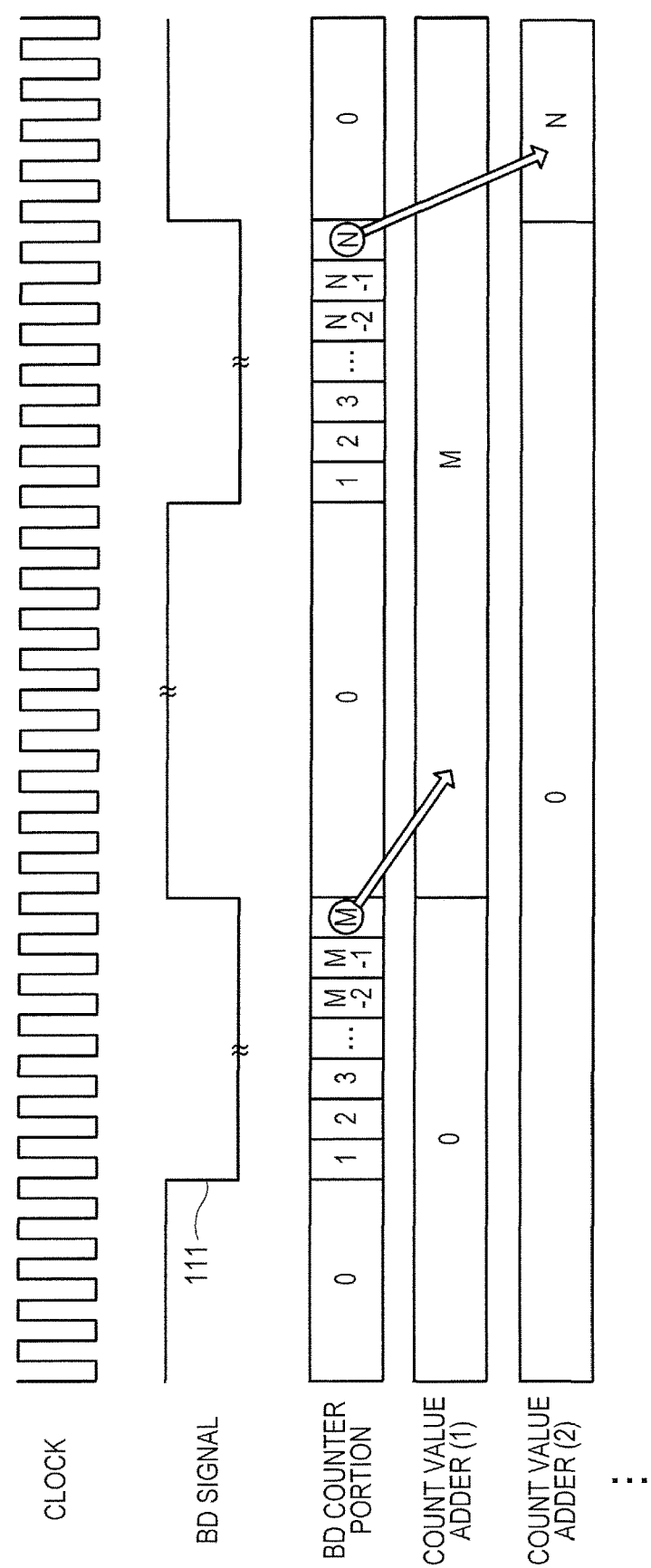
FIG. 8 is an explanatory diagram for illustrating a counting operation to be executed by a BD counter portion in the first embodiment.
Figure 9:
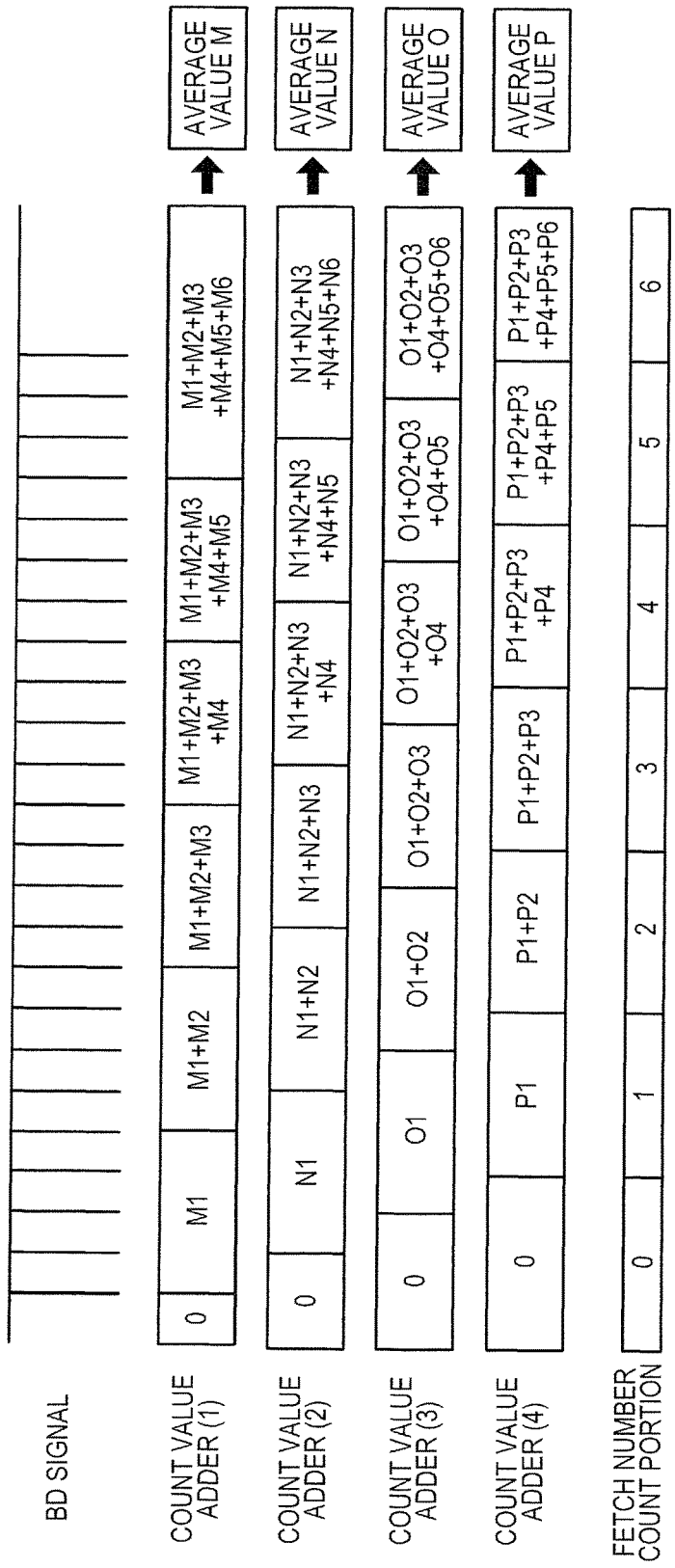
FIG. 9 is an explanatory diagram for illustrating an operation of calculating a pulse width of the BD signal.

Now, with reference to FIG. 8 and FIG. 9, the surface identification processing that is based on the result of measuring the pulse width of the BD signal 111 is described. FIG. 8 is an explanatory diagram for illustrating a counting operation to be executed by the BD counter portion 1012 in the first embodiment. FIG. 9 is an explanatory diagram for illustrating an operation of calculating the pulse width of the BD signal 111. In the first embodiment, the BD signal 111 is an active low signal. However, the BD signal 111 is not limited thereto, and may be an active high signal. Further, the number of reflection surfaces 415 of the rotary polygon mirror 405 is four. However, the number of reflection surfaces 415 is not limited thereto, and may be, for example, three, five, or six. The number of count value adders 1013 corresponds to the number of reflection surfaces 415. In the first embodiment, the four count value adders 1013 are provided in correspondence to the four reflection surfaces 415.

The BD counter portion 1012 starts to count the pulse width in response to the falling edge of the BD signal 111. After the BD counter portion 1012 starts to count the pulse width, the BD counter portion 1012 continues to count up the pulse width in synchronization with the clock during an effective state (hereinafter referred to as "asserted state") of the BD signal 111. The clock may be an output synchronization clock of the VDO signal 110, or may be a dedicated high-frequency clock in order to improve the counting accuracy. When the BD signal 111 is in an invalid state (hereinafter referred to as "negated state"), the count value of the BD counter portion 1012 is reset to 0. The BD counter portion 1012 repeats a counting operation and a resetting operation in accordance with the asserted and negated states of the BD signal 111.

The BD count value adder (1), count value adder (2), count value adder (3), and count value adder (4) are configured to sequentially hold count values of the BD counter portion 1012 as described below. When the BD counter portion 1012 is reset, the count value adder (1) holds the count value of the BD counter portion 1012 at that time. Next, when the BD counter portion 1012 is reset, the count value adder (2) holds the count value of the BD counter portion 1012 at that time. Next, when the BD counter portion 1012 is reset, the count value adder (3) holds the count value of the BD counter portion 1012 at that time. Next, when the BD counter portion 1012 is reset, the count value adder (4) holds the count value of the BD counter portion 1012 at that time. Next, when the BD counter portion 1012 is reset, the count value adder (1) holds the count value of the BD counter portion 1012 at that time. In this manner, at a timing of resetting the BD counter portion 1012, the count value adders (1), (2), (3), (4), (1), and (2), . . . , sequentially hold count values. Meanwhile, every time the count value is added to the count value adder (4), the value of the fetch number count portion 1014 is incremented.

After the above-mentioned operation is performed for a predetermined period of time, the average value calculating portion 1015 divides values of the count value adder (1), the count value adder (2), the count value adder (3), and the count value adder (4) by the value of the fetch number count portion 1014. With this, the average value calculating portion 1015 calculates average values M, N, O, and P of pulse widths of the BD signal 111 corresponding to the respective plurality of reflection surfaces 415. The surface information generating portion 1016 compares the average values M, N, O, and P of pulse widths of the BD signal 111 with reference information on the reflection surface 415a, 415b, 415c, and 415d of the rotary polygon mirror 405 stored in advance. The surface information generating portion 1016 determines correspondence between the BD signal 111 and the reflection surface 415 of the rotary polygon mirror 405 based on the comparison result. The image processing portion 1018 assigns, based on the determination result, each parameter of the reflection surfaces 415a, 415b, 415c, and 4165d to image information associated with the corresponding BD signal 111 to execute image processing.

<Operation of Controlling Surface Identifying Portion>

Figure 10:
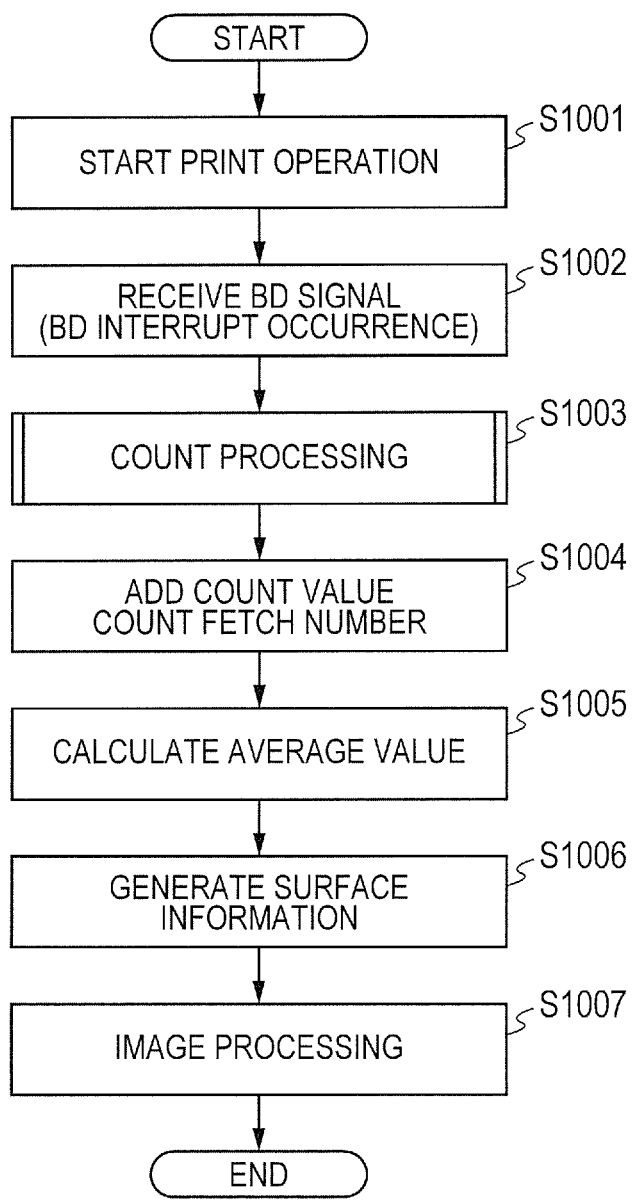
FIG. 10 is a flowchart for illustrating an image forming operation to be executed by the image forming apparatus.

With reference to FIG. 10, a control operation of the surface identifying portion 1011 in the first embodiment is described. FIG. 10 is a flowchart for illustrating an image forming operation to be executed by the image forming apparatus 9. The image forming apparatus 9 receives an operation for print processing from the user to start a print operation (Step S1001). When a print operation is started, the rotary polygon mirror 405 starts rotation, and the BD 409 receives a light beam deflected by the rotary polygon mirror 405 to generate the BD signal 111. The image modulating portion 101 receives the BD signal generated by the BD 409 (Step S1002). The BD signal 111 received by the image modulating portion 101 is input to the BD counter portion 1012 and the image processing portion 1018. The BD counter portion 1012 executes the count processing of the BD signal 111 (Step S1003). The count processing is described later. The count value of the BD counter portion 1012 is added by the count value adder 1013 for the fetch number count portion 1014 to count the number of times the count value is fetched (Step S1004). Specifically, the count value of the BD counter portion 1012 is sequentially added by each of the count value adders (1), (2), (3), and (4) in order of the count value adders (1), (2), (3), (4), (1), and (2), . . . . Further, 1 is added to the count value of the fetch number count portion 1014 every time the count value is fetched to all of the count value adders (1), (2), (3), and (4).

Each of the count value adders (1), (2), (3), and (4) and the value of the fetch number count portion 1014 are input to the average value calculating portion 1015. The average value calculating portion 1015 divides each value of the count value adders (1), (2), (3), and (4) by the value of the fetch number count portion 1014. With this, the average values M, N, O, and P of pulse widths of the BD signal 111 corresponding to the respective plurality of reflection surfaces 415 are calculated (Step S1005). The average values M, N, O, and P are input to the surface information generating portion 1016. The surface information generating portion 1016 executes the surface identification processing for the reflection surface 415 of the rotary polygon mirror 405 based on the average values M, N, O, and P and reference information on the reflection surface 415a, 415b, 415c, and 4165d of the rotary polygon mirror 405, to thereby generate surface information (Step S1006).

In the surface identification processing, a reflection surface is identified by pattern matching (checking) between the reference information on the reflection surfaces 415a, 415b, 415c, and 4165d and the average values M, N, O, and P. However, the surface identification processing is not limited thereto, and a reflection surface having the maximum or minimum width of the BD signal 111 may be set as a reference surface, and the maximum value or minimum value of the average values may be used to identify the reference surface. The surface information is information for identifying correspondence between the BD signal 111 at some timing and the reflection surface 415. That is, the surface information is information for identifying a correspondence relationship between the detected BD signal 111 and the reflection surface 415. The surface information generating portion 1016 outputs the surface information to the image processing portion 1018. The image processing portion 1018 uses a parameter of the reflection surface 415 corresponding to the BD signal 111 detected based on the surface information, to execute image processing (Step S1007). The image processing portion 1018 generates the VDO signal 110 processed based on the surface information for output to the laser driver 300.

<Count Processing>

Figure 11:
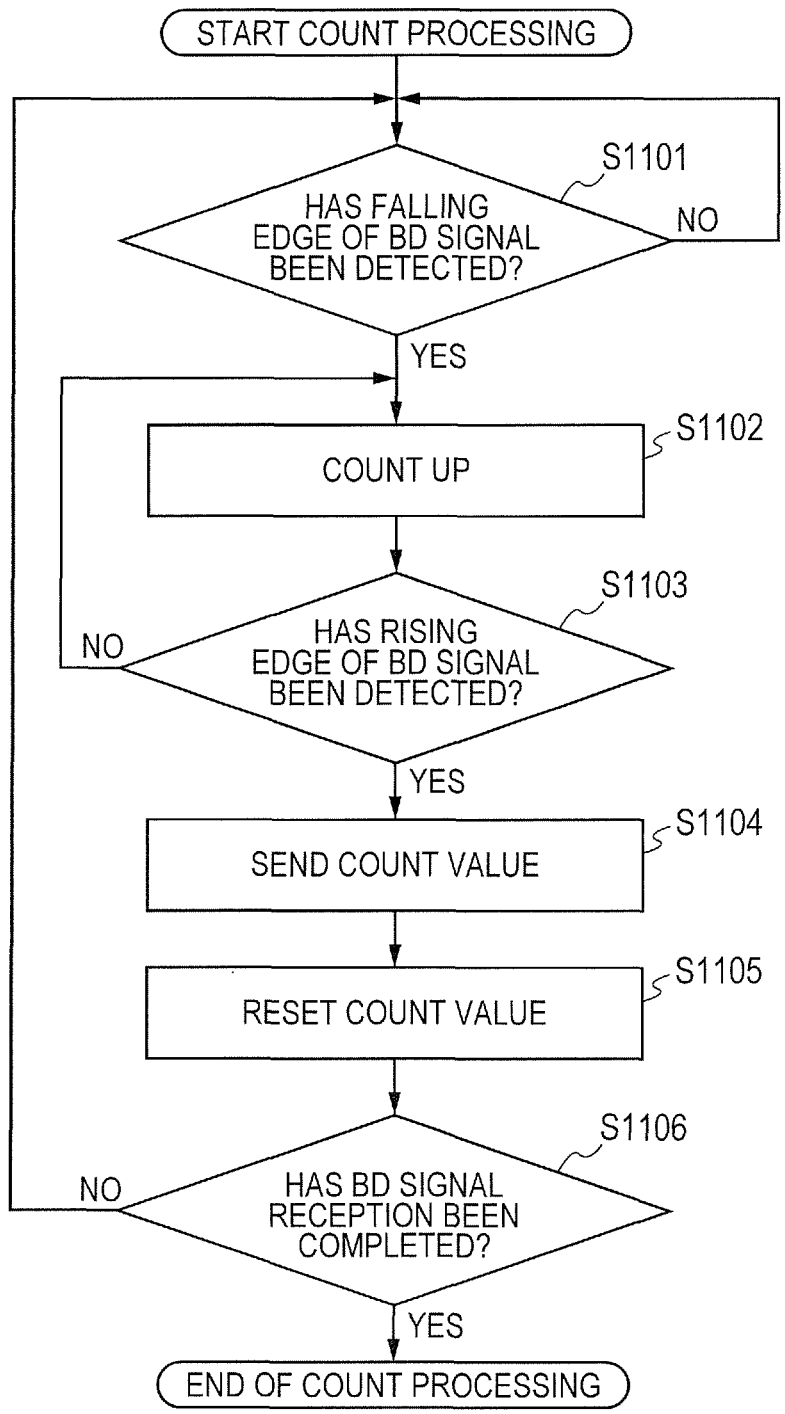
FIG. 11 is a flowchart for illustrating count processing to be executed by a surface identifying portion in the first embodiment.

With reference to FIG. 11, the count processing of Step S1003 is described. FIG. 11 is a flowchart for illustrating the count processing to be executed by the surface identifying portion 1011 in the first embodiment. FIG. 11 is an illustration of an example of the count processing in a case where the BD signal 111 is an active low signal. However, when the BD signal 111 is an active high signal, "HIGH" and "LOW" may be switched in the following description. When the count processing is started, the BD counter portion 1012 monitors the BD signal 111, and determines whether or not the falling edge of the received BD signal 111 has been detected (whether or not BD signal 111 has transitioned to "LOW") (Step S1101). When the falling edge of the BD signal 111 has been detected (when BD signal 111 has transitioned to "LOW") (YES in Step S1101), the BD counter portion 1012 counts up the pulse width in synchronization with the clock (Step S1102). The BD counter portion 1012 determines whether or not the rising edge of the BD signal 111 has been detected (whether or not BD signal 111 has transitioned to "HIGH") (Step S1103). When the rising edge of the BD signal 111 has not been detected (when BD signal 111 remains "LOW") (NO in Step S1103), the BD counter portion 1012 returns to Step S1102 to continue to count up the pulse width.

When the rising edge of the BD signal 111 has been detected (when BD signal 111 has transitioned to "HIGH"), the BD counter portion 1012 fetches the count value to the count value adder 1013, and sends the count value to the fetch number count portion 1014 (Step S1104). After sending of the count value, the BD counter portion 1012 resets the count value to 0 (Step S1105). The BD counter portion 1012 determines whether or not reception of the BD signal 111 has been completed (Step S1106). Reception of the BD signal 111 may be determined to have been completed when the BD signal 111 is not in the asserted state even after a predetermined period of time. Alternatively, reception of the BD signal 111 may be determined to have been completed when a signal to the effect that the print operation has been completed is received.

In this manner, through counting of the pulse width of the BD signal 111 generated by a light beam deflected by each reflection surface 415, it is possible to determine correspondence between a BD signal at some timing and the reflection surface 415 that has generated the BD signal. That is, the reflection surface corresponding to the rotation phase of the rotary polygon mirror 405 is identified.

According to the first embodiment, it is possible to identify the rotation phase of the rotary polygon mirror with a simple configuration and at low costs.

Second Embodiment

Now, a second embodiment of the present invention is described. In the second embodiment, the same component as that in the first embodiment is assigned with the same reference numeral, and a description thereof is omitted here. In the first embodiment, the image forming apparatus 9 configured to generate one pulse of the BD signal 111 for one reflection surface 415 of the rotary polygon mirror 405 by deflecting one light beam by the reflection surface 415 is described. In the second embodiment, a description is given of the image forming apparatus 9 configured to generate a plurality of pulses of the BD signal 111 for one reflection surface 415 of the rotary polygon mirror 405 by deflecting a plurality of light beams by the reflection surface 415. For example, when two light beams are deflected by one reflection surface, two pulses of the BD signal 111 are output for one reflection surface. Thus, in the second embodiment, a description is given of the surface identification processing to be executed by the image forming apparatus 9 using the light scanning apparatus 400 configured to scan two lines with two light beams in parallel. The image forming apparatus 9, the imaging lens 406, the exposure control system 301, and the image modulating portion 101 in the second embodiment are the same as those in the first embodiment, and thus a description thereof is omitted here.

<Light Scanning Apparatus>

Figure 12A:
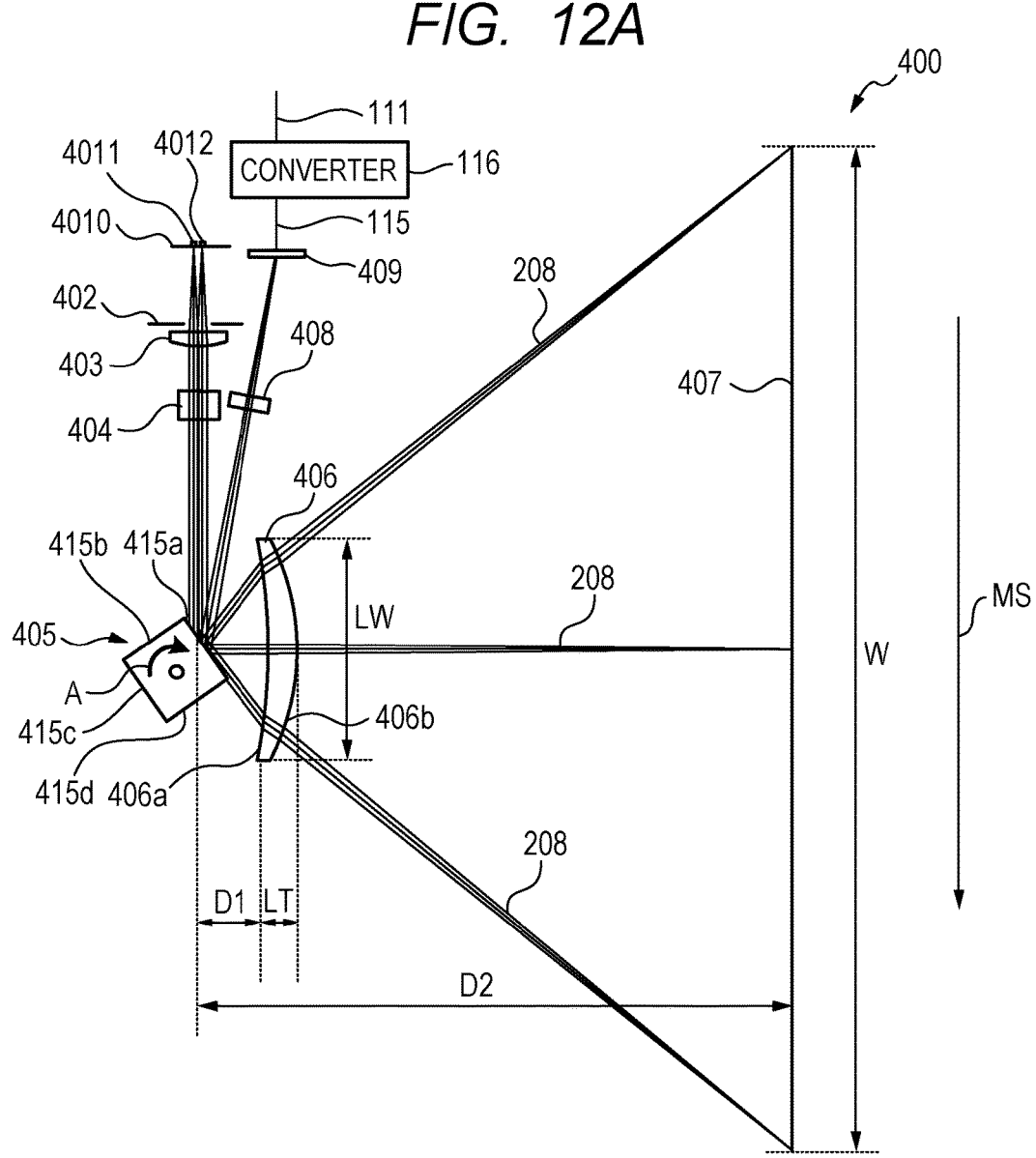
FIG. 12A and FIG. 12B are cross-sectional views of a light scanning apparatus in a second embodiment of the present invention.
Figure 12B:
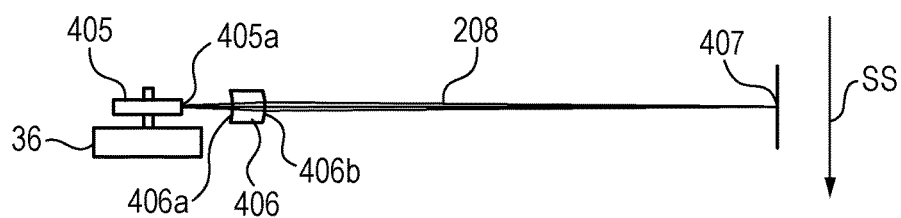

FIG. 12A and FIG. 12B are cross-sectional views of the light scanning apparatus 400 in the second embodiment. FIG. 12A is a view for illustrating a main scanning section of the light scanning apparatus 400. FIG. 12B is a view for illustrating a sub-scanning section of the light scanning apparatus 400. A light source 4010 of the light scanning apparatus 400 includes a plurality of light emitting portions configured to be controlled independently. In the second embodiment, the light source 4010 includes two light emitting portions. The two light emitting portions are a first light emitting portion 4011 and a second light emitting portion 4012. Two light beams emitted by the first light emitting portion 4011 and the second light emitting portion 4012 reach the scanned surface 407 via the aperture-stop 402, the coupling lens 403, the anamorphic lens 404, the rotary polygon mirror 405, and the imaging lens 406. The two light beams form two light spots at positions on the scanned surface 407 that are deviated from each other in the sub-scanning direction. Further, the light beams enter the BD 409 via the BD lens 408. The BD 409 receives the two light beams to output two light receiving signals (analog signals) 115. The light receiving signal 115 is input to the converter 116 serving as a conversion unit. The converter 116 converts the two light receiving signals 115 into the BD signals 111 as two pulse signals. In the second embodiment, the BD signal 111 is an active low (negative logic) signal, but may be an active high (positive logic) signal. When the BD signal 111 is an active low (negative logic) signal, the low level part is considered to be a pulse. The converter 116 outputs the two BD signals 111 corresponding to a plurality of reflection surfaces.

Figure 13A:
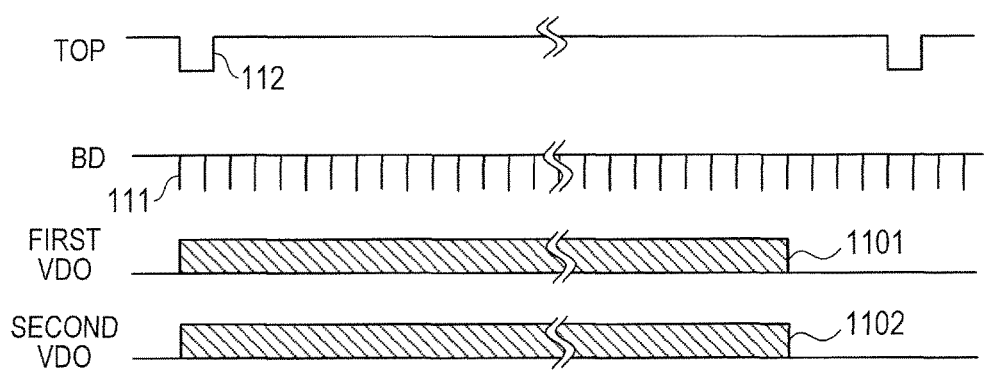
FIG. 13A and FIG. 13B are timing charts of a BD signal and a VDO signal in the second embodiment.
Figure 13B:
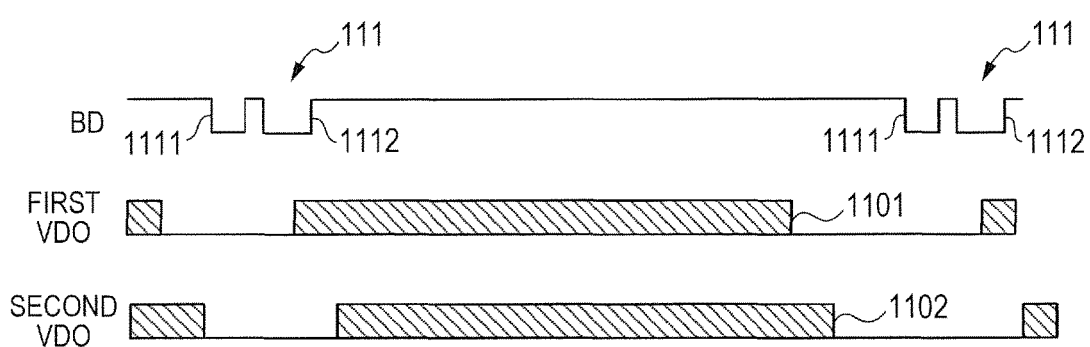

FIG. 13A and FIG. 13B are timing charts of a BD signal (synchronization signal) and a VDO signal (image signal) in the second embodiment. FIG. 13A is a timing chart of the TOP signal 112, the BD signal 111, the first VDO signal 1101, and the second VDO signal 1102 for an image forming operation corresponding to one page of a recording medium in the second embodiment. In the second embodiment, the TOP signal 112 and the BD signal 111 are active low signals, but may be active high signals. In the second embodiment, two light beams are scanned at the same time, and thus the first VDO signal 1101 and the second VDO signal 1102 are generated. When the image signal generating portion 100 receives "LOW" of the TOP signal 112, the image signal generating portion 100 sends the first VDO signal 1101 and the second VDO signal 1102 to the laser driver 300 in synchronization with the BD signal 111. In FIG. 13A, for the sake of simplicity of illustration, the first VDO signal 1101 and the second VDO signal 1102 are drawn to be output continuously across the plurality of BD signals 111.

In the second embodiment, two light beams are scanned at the same time, and thus the BD signal 111 is formed of a first BD signal 1111 and a second BD signal 1112 in actuality. FIG. 13B is a timing chart of the first BD signal 1111, the second BD signal 1112, the first VDO signal 1101, and the second VDO signal 1102. The first VDO signal 1101 is output for a predetermined period of time between the first BD signal 1111 and the first BD signal 1111. When the image signal generating portion 100 receives the falling edge of the pulse of the first BD signal 1111, the image signal generating portion 100 sends the first VDO signal 1101 after a predetermined period of time so that a latent image is formed at a position a predetermined distance away from the left edge of the photosensitive drum 4. The second VDO signal 1102 is output during a period of time between the second BD signal 1112 and the first BD signal 1111. When the image signal generating portion 100 receives the falling edge of the pulse of the second BD signal 1112, the image signal generating portion 100 sends the second VDO signal 1102 after a predetermined period of time. A light beam is emitted from the first light emitting portion 4011 of the light source 4010 based on the first VDO signal 1101 so that a latent image is formed on the photosensitive drum 4. A light beam is emitted from the second light emitting portion 4012 of the light source 4010 based on the second VDO signal 1102 so that a latent image is formed on the photosensitive drum 4. In this manner, two (plurality of) lines of latent images are formed substantially at the same time in parallel.

<Surface Identification Processing for Rotary Polygon Mirror>

Figure 14:
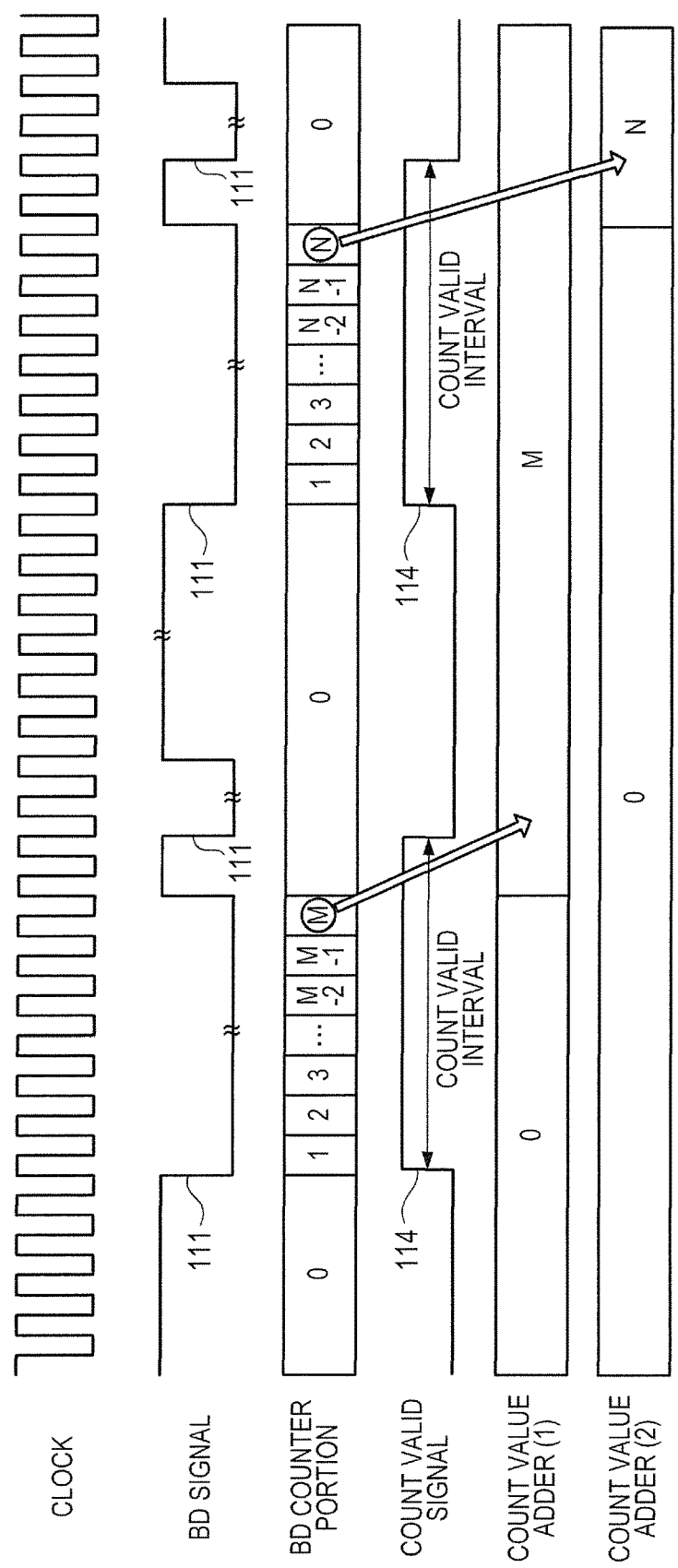
FIG. 14 is an explanatory diagram for illustrating a counting operation to be executed by a BD counter portion in the second embodiment.

Now, with reference to FIG. 14, the surface identification processing that is based on the result of measuring the pulse width of the BD signal 111 is described. FIG. 14 is an explanatory diagram for illustrating a counting operation to be executed by the BD counter portion 1012 in the second embodiment. The number of reflection surfaces 415 of the rotary polygon mirror 405 is four. However, the number of reflection surfaces 415 is not limited thereto, and may be, for example, three, five, or six. The number of count value adders 1013 corresponds to the number of reflection surfaces 415. In the second embodiment, the four count value adders 1013 are provided in correspondence to the four reflection surfaces 415.

The BD counter portion 1012 includes a valid signal generation portion (not shown) configured to generate the count valid signal 114. The valid signal generation portion (not shown) includes a toggle mechanism (changeover unit) configured to toggle the count valid signal 114 to change over between a count valid interval (measurement valid interval) and a count invalid interval (measurement valid interval) when the falling edge of the BD signal 111 is detected. The BD counter portion 1012 determines whether or not the count valid signal 114 indicates a count valid interval. The BD counter portion 1012 counts the pulse width of the BD signal 111 based on the clock in a count valid interval.

When the BD counter portion 1012 detects the falling edge of the BD signal 111 and the count valid signal 114 indicates a count valid interval, the BD counter portion 1012 starts to count the pulse width. After the BD counter portion 1012 starts to count the pulse width, the BD counter portion 1012 continues to count up the pulse width in synchronization with the clock while the BD signal 111 is in an asserted state. When the BD signal 111 is in a negated state, the count value of the BD counter portion 1012 is reset to 0. When the count valid signal 114 does not indicate a count valid interval, the BD counter portion 1012 does not count the clock even when the BD signal 111 is in an asserted state. After that, the BD counter portion 1012 repeatedly executes the counting operation and the resetting operation depending on whether or not the count valid signal 114 indicates a count valid interval and whether the BD signal 111 is in an asserted state or negated state. In this manner, it is possible to identify the reflection surface 415 even when two light beams are scanned at the same time by the BD counter portion 1012 counting the continuous BD signals 111 in every other signal.

<Count Processing>

Figure 15:
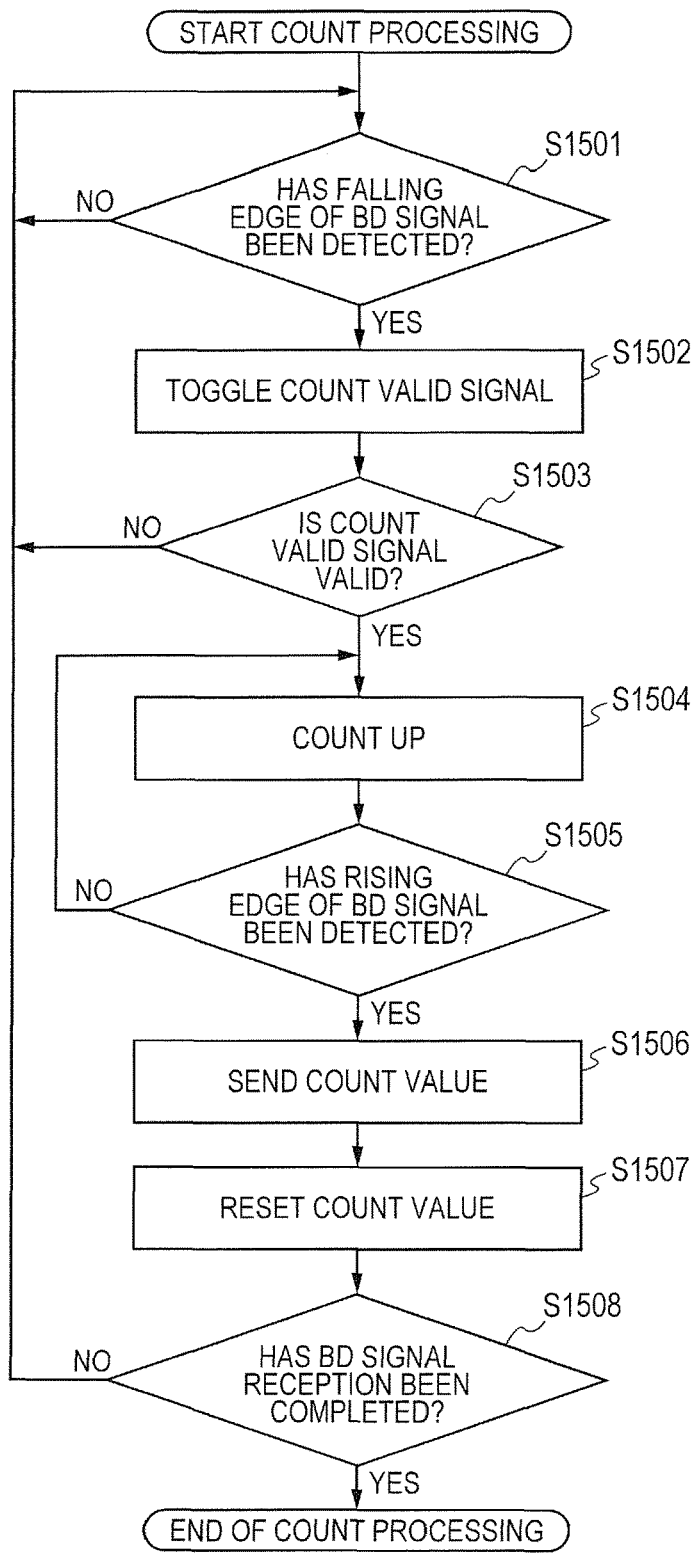
FIG. 15 is a flowchart for illustrating count processing to be executed by a surface identifying portion in the second embodiment.

FIG. 15 is a flowchart for illustrating the count processing to be executed by the surface identifying portion 1011 in the second embodiment. FIG. 15 is an illustration of an example of the count processing in a case where the BD signal 111 is an active low signal. However, when the BD signal 111 is an active high signal, "HIGH" and "LOW" may be switched in the following description. When the count processing is started, the BD counter portion 1012 monitors the BD signal 111, and determines whether or not the falling edge of the received BD signal 111 has been detected (whether or not BD signal 111 has transitioned to "LOW") (Step S1501). When the falling edge of the BD signal 111 has been detected (when BD signal 111 has transitioned to "LOW") (YES in Step S1501), the BD counter portion 1012 toggles the count valid signal 114 (Step S1502). The BD counter portion 1012 determines whether or not the count valid signal 114 indicates a count valid interval (Step S1503). When the count valid signal 114 does not indicate a count valid interval (NO in Step S1503), the processing returns to Step S1501. When the count valid signal 114 indicates a count valid interval (YES in S1503), the BD counter portion 1012 counts up the pulse width in synchronization with the clock (Step S1504). The processing steps of Steps S1504, S1505, S1506, S1507, and S1508 are the same as those of Steps S1102, S1103, S1104, S1105, and S1106 in the first embodiment illustrated in FIG. 11, respectively, and thus a description thereof is omitted here.

In this manner, through counting of the pulse widths of the BD signals 111 generated by two light beams deflected by each reflection surface 415 in every other signal, it is possible to determine correspondence between a BD signal at some timing and the reflection surface 415 that has generated the BD signal. That is, the reflection surface corresponding to the rotation phase of the rotary polygon mirror 405 is identified.

According to the second embodiment, it is possible to identify the rotation phase of the rotary polygon mirror with a simple configuration and at low costs.

According to the present invention, it is possible to identify the rotation phase of the rotary polygon mirror with a simple configuration and at low costs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091065, filed May 1, 2017, which is hereby incorporated by reference herein in its entirety.

What is claimed is:

1. An image forming apparatus comprising:
a light source configured to emit a light beam;
a rotary polygon mirror including a plurality of reflection surfaces each configured to deflect the light beam emitted by the light source so that the light beam scans a surface of a photosensitive member;
plural count value holding units of a number that corresponds to a number of the plural reflection surfaces;
a light receiving portion configured to output a light receiving signal by receiving the light beam reflected by each of the plurality of reflection surfaces;
a conversion unit configured to convert the light receiving signal to a pulse signal;
a measurement unit configured to measure pulse widths of a plurality of pulse signals corresponding to the plurality of reflection surfaces, respectively, wherein the measurement unit includes: a clock signal generation unit configured to generate a clock signal of a predetermined frequency; and a count unit configured to count the clock signal; and
an identification unit configured to identify a rotation phase of the rotary polygon mirror based on a measurement result of the measurement unit and reference values to be compared with the measurement result,
wherein the measurement unit measures pulse widths of the plurality of pulse signals by count values of the count unit, and
wherein the count unit causes the count value holding units of the number of the reflection surfaces to sequentially hold the count values.

2. An image forming apparatus according to claim 1, further comprising a lens having no fθ characteristic and configured to guide the light beam deflected by the rotary polygon mirror onto the surface of the photosensitive member.

3. An image forming apparatus according to claim 1, further comprising a calculation unit configured to calculate average values of the count values held by the count value holding units of the number of the reflection surfaces, respectively,
wherein the identification unit identifies a reflection surface corresponding to the rotation phase identified based on the average values and the reference values.

4. An image forming apparatus according to claim 3, wherein the identification unit identifies the reflection surface corresponding to the rotation phase by checking the average values against the reference values.

5. An image forming apparatus according to claim 3, wherein the identification unit identifies the reflection surface corresponding to the rotation phase based on a maximum value or a minimum value of the average values and the reference values.

6. An image forming apparatus according to claim 1, further comprising a storage configured to store the reference values in advance.

7. An image forming apparatus comprising:
a light source configured to emit a plurality of light beams;
a rotary polygon mirror including a plurality of reflection surfaces each configured to deflect the plurality of light beams emitted by the light source so that the plurality of light beams scan a surface of a photosensitive member;
plural count value holding units of a number that corresponds to a number of the plural reflection surfaces;
a light receiving portion configured to output a plurality of light receiving signals by receiving the plurality of light beams reflected by each of the plurality of reflection surfaces;
a conversion unit configured to convert the plurality of light receiving signals to a plurality of pulse signals;
a changeover unit configured to change over between a measurement valid interval and a measurement invalid interval; and
a measurement unit configured to measure a pulse width of a pulse signal in the measurement valid interval among the plurality of pulse signals corresponding to the plurality of reflection surfaces, respectively, wherein the measurement unit includes: a clock signal generation unit configured to generate a clock signal of a predetermined frequency; and a count unit configured to count the clock signal; and
an identification unit configured to identify a rotation phase of the rotary polygon mirror based on a measurement result of the measurement unit and reference values to be compared with the measurement result,
wherein the measurement unit measures pulse widths of the plurality of pulse signals by count values of the count unit, and
wherein the count unit causes the count value holding units of the number of the reflection surfaces to sequentially hold the count values.

8. An image forming apparatus according to claim 7, further comprising a lens having no fθ characteristic and configured to guide the plurality of light beams deflected by the rotary polygon mirror onto the surface of the photosensitive member.

9. An image forming apparatus according to claim 7, further comprising a calculation unit configured to calculate average values of the count values held by the count value holding units of the number of the reflection surfaces, respectively,
wherein the identification unit identifies a reflection surface corresponding to the rotation phase identified based on the average values and the reference values.

10. An image forming apparatus according to claim 9, wherein the identification unit identifies the reflection surface corresponding to the rotation phase by checking the average values against the reference values.

11. An image forming apparatus according to claim 9, wherein the identification unit identifies the reflection surface corresponding to the rotation phase based on a maximum value or a minimum value of the average values and the reference values.

12. An image forming apparatus according to claim 7, further comprising a storage configured to store the reference values in advance.

13. An image forming apparatus comprising:
a light source configured to emit two light beams;
a rotary polygon mirror including a plurality of reflection surfaces each configured to deflect the two light beams emitted by the light source so that the two light beams scan a surface of a photosensitive member;
plural count value holding units of a number that corresponds to a number of the plural reflection surfaces;
a light receiving portion configured to output two light receiving signals by receiving the two light beams reflected by each of the plurality of reflection surfaces;
a conversion unit configured to convert the two light receiving signals to two pulse signals;
a measurement unit configured to measure pulse widths of continuous pulse signals output from the conversion unit in every other pulse signal, wherein the measurement unit includes: a clock signal generation unit configured to generate a clock signal of a predetermined frequency; and a count unit configured to count the clock signal; and
an identification unit configured to identify a rotation phase of the rotary polygon mirror based on a measurement result of the measurement unit and reference values to be compared with the measurement result,
wherein the measurement unit measures pulse widths of the two pulse signals by count values of the count unit, and
wherein the count unit causes the count value holding units of the number of the reflection surfaces to sequentially hold the count values.

14. An image forming apparatus according to claim 13, further comprising a lens having no fθ characteristic and configured to guide the two light beams deflected by the rotary polygon mirror onto the surface of the photosensitive member.

\* \* \* \* \*